United States Patent
Omori

(10) Patent No.: US 6,438,087 B2
(45) Date of Patent: *Aug. 20, 2002

(54) CHUCKING DEVICE FOR DISC DRIVE

(75) Inventor: Kiyoshi Omori, Tokyo (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/196,509

(22) Filed: Nov. 20, 1998

(30) Foreign Application Priority Data

| Nov. 25, 1997 | (JP) | ................................. 09-323038 |
| Dec. 18, 1997 | (JP) | ................................. 09-349015 |
| Jan. 20, 1998 | (JP) | ................................. 10-008467 |
| Feb. 20, 1998 | (JP) | ................................. 10-038599 |

(51) Int. Cl.$^7$ ................................. G11B 17/028
(52) U.S. Cl. ................................. 369/75.2
(58) Field of Search ................................. 369/75.2, 270, 369/271, 75.1, 36; 360/453

(56) References Cited

U.S. PATENT DOCUMENTS

| 4,509,157 A | * | 4/1985 | Morinaga ................ 369/75.2 |
| 4,570,194 A | * | 2/1986 | Schatteman ............ 360/99.12 |
| 4,774,609 A | * | 9/1988 | Sato ..................... 360/99.04 |
| 4,787,079 A | * | 11/1988 | Ueno .................... 369/270 |
| 4,823,337 A | * | 4/1989 | Zanten et al. .......... 369/270 |
| 5,001,700 A | * | 3/1991 | Rowden et al. ........ 369/270 |
| 5,414,679 A | * | 5/1995 | Menke .................. 369/36 |
| 5,914,929 A | * | 6/1999 | Kato et al. ............. 369/75.2 |

FOREIGN PATENT DOCUMENTS

| JP | 09180330 | * | 7/1997 |

\* cited by examiner

*Primary Examiner*—David Hudspeth
*Assistant Examiner*—Angel Castro
(74) *Attorney, Agent, or Firm*—Oblon, Spivak, McClelland, Maier & Neustadt, P.C.

(57) ABSTRACT

A disc chucking device comprises a first magnet for drawing down a chucking pulley downward toward the pulley support member when a disc is chucked comprises the first magnet embedded at the center of the chucking pulley and the first yoke provided in close contact with the upper side of the first magnet, and a second magnet for drawing up the chucking pulley from the pulley support member when a disc is unloaded comprises the second magnet embedded at the level position upper than that of the first yoke at the center of the chucking pulley and a top cover. Disc chucking is performed strongly and the whole optical disc drive is made thin.

13 Claims, 18 Drawing Sheets

US 6,438,087 B2

CHUCKING DEVICE FOR DISC DRIVE

BACKGROUND OF THE INVENTION

1. Field of the Invention

This invention relates to a disc chucking device of an optical disc drive which loads an optical disc using a disc tray, and chucks the loaded optical disc on a disc table using a chucking pulley.

2. Description of Related Art

A sort of optical disc drive which the inventors of the present invention have applied is described with reference to FIGS. 11 to 18. In detail, as shown in FIG. 17, an optical disc 1 is placed horizontally in a pit 3 formed on the upper surface of a disc tray 2, thereafter, when a front panel 2a of the disc tray 2 is pressed lightly in the direction indicated by an arrow $a_1$, a loading switch (not shown in the drawing) is turned on, the disc tray 2 is drawn horizontally from the direction indicated by the arrow $a_1$ namely the loading direction into the optical disc drive through a tray gate 4 by means of a loading mechanism which will described hereinafter as shown in FIG. 18, and as the result, the optical disc 1 is automatically loaded horizontally on a disc table of a spindle motor.

After loading, the optical disc 1 is rotated at high speed by the spindle motor in response to a recording and/or reproducing command signal supplied from a host computer, data in the optical disc 1 is recorded and/or reproduced by an optical pickup. After reproduction of the optical disc 1, the disc tray 2 is unloaded automatically in the direction of the arrow $a_2$ namely the unloading direction to the outside of the optical disc drive through the tray gate 4 in response to an unloading command signal supplied from the host computer as shown in FIG. 17.

Next, as shown in FIGS. 11 to 16, the disc tray 2 consists of synthetic resin, and a slotted hole bottom aperture 8 is formed along a tray center $P_1$ extending from the center of the pit 3 to the rear end 2b side. A pair of right and left guide rails 9 is formed combinedly in parallel to the tray center $P_1$ on the right and left side edges of the disc tray 2. On one end of the bottom surface of the disc tray 2, J-shaped parallel rack 10 and guide groove 11 are formed combinedly. The linear portions 10a and 11a of the rack 10 and the guide groove 11 are formed in parallel to the tray center $P_1$, and on the end of the front panel 2a side, the circular portions 10b and 11b are formed.

Next, a box-shaped chassis formed of synthetic resin is provided in the internal of the optical disc drive 5, and the pair of right and left guide rails 9 of the disc tray 2 is guided by a plurality of tray guides 15 formed combinedly on the inside of the right and left side plates 14a of the chassis 14 and slid in the direction of arrows $a_1$ and $a_2$. A lift frame 16 formed of synthetic resin is attached on the bottom 14b of the chassis 14. Insulator fixing members 17 and 18 are formed combinedly at two positions on the right and left sides of the rear end 16a side of the lift frame 16 and at the center position of the front end 16b of the lift frame 16, namely total three positions, and three insulators 19 and 20, which are dampers consisting of elastic material such as rubber, are fixed to these insulator fixing members 17 and 18.

The right and left insulators 19 fixed to the rear end 16a of the lift frame 16 are fixed on the bottom 14b of the chassis 14 with a fixing screw 21 inserted through the center of these insulators 19, one insulator 20 fixed to the front end 16b of the lift frame 16 is fixed on the end of the lift driving lever 23 with a fixing screw 22 inserted through the center of the insulator 20. The lift driving lever 23 is disposed perpendicularly to the tray center $P_1$ and the base of the lift driving lever 23 is attached on the bottom 14b of the chassis 14 with a pair of horizontal right and left support pins 24 so that the lift driving lever 23 is rotatable in the vertical direction namely in the direction of arrows $b_1$ and $b_2$.

In other words, the lift frame 16 is structured so as to be driven vertically in the direction of arrows $c_1$ and $c_2$ correspondingly to rotational movement in the vertical direction around the pair of right and left insulators 19 of the rear end 16a side by the lift driving lever 23. A shallow groove 25 is formed on the upper surface of the lift frame 16.

The loading mechanism 27 is mounted on one side of the front end 16b side of the lift frame 16 on the bottom 14b of the chassis 14. The loading mechanism 27 is provided with a loading motor 28, a pinion 29 which is rotated in forward-reverse direction by the loading motor 28, a pinion lever 31 which moves a center shaft 29a of the pinion 29 swingingly in the direction of arrows $d_1$ and $d_2$ in the horizontal plane around a vertical rocking lever shaft 30, a cam lever 34 which is driven by the pinion lever 31 with interposition of a pair of partial gears 32 and rotated in the direction of the arrows $e_1$ and $e_2$ in the horizontal plane around a vertical rocking lever shaft 33, a camgroove 35 formed circularly around the rocking lever shaft 33 of the cam lever 34 having a level difference in the vertical direction, and a cam driven pin 36 formed combinedly on one side of the end of the lift driving lever 23 and engaged movably in the cam groove 35. The pinion 29 is engaged in the rack 10 of the disc tray 2, and the center shaft 29a of the pinion 29 is engaged movably in the guide groove 11.

The loading mechanism 27 allows the pinion 29 to move along the J-shaped rack 10 of the disc tray 2 by guiding the center shaft 29a of the pinion 29 along the approximately J-shaped guide groove 11 of the disc tray 2. In detail, when a disc is loaded on the disc tray 2, the pinion 29 which is driven in forward-reverse direction by the loading motor 28 drives the linear portion 10a of the rack 10 linearly toward the front panel 2a side from the rear end 2b side of the disc tray 2 and thereby draws the disc tray 2 in the optical disc drive 5 horizontal in the direction of the arrow a. Continuous forward rotation of the pinion 29 by the loading motor 28 allows the pinion 29 to swing in the direction of the arrow d along the circular portion 10b of the rack 10, when, the pinion lever 31 rotates the cam lever 34 in the direction of the arrow $e_1$ with interposition of the pair of partial gears 32.

The cam driven pin 36 of the lift driving lever 23 is elevated upward namely in the direction of the arrow $b_1$ in the cam groove 35 of the cam lever 34, thereby the lift frame 16 is lifted upward in the direction of the arrow $c_1$ around the pair of right and left insulators 19 using the lift driving lever 23 with interposition of the insulator 20 from the lower position with downward inclination as shown in FIG. 15 to the lifted horizontal upper position as shown in FIG. 16. When the disc tray 2 is unloaded, the reversed loading operation is operated, in detail, the cam lever 34 is rotated in the direction of the arrow $e_2$ while the pinion 29 which is reversibly rotated by the loading motor 28 is swung in the direction of the arrow $d_2$ along the circular portion 10b of the rack 10, the cam driven pin 36 is driven downward in the direction of the arrow $b_2$ namely downward along the cam groove 35, and the lift driving lever 23 drives the lift frame 1b downward in the direction of the arrow $c_2$ around the pair of right and left insulators 19 with interposition of the insulator 20 from the upper position shown in FIG. 16 to the lower position shown in FIG. 15. In continuous reverse rotation of the pinion 29 driven by the loading motor 28, the pinion 29 drives linearly the linear portion 10a of the rack 10 from the front panel 2a side to the rear end 2b of the disc tray 2, and the disc tray 2 is pressed out in the direction of the arrow $a_2$ to the outside of the optical disc drive 5.

In the shallow groove 25 of the lift frame 16, a spindle motor 39 is fixed vertically on the mounting member 38 formed at the position deviated to the front end 16b, a disc table 40 consisting of magnetic metal material such as stainless steel is fixed on the top end of the motor shaft 39a. A conical trapezoid centering guide 40a to be engaged into the center hole 1a of the optical disc 1 is formed combinedly on the upper center of the disc table. An optical pickup 41 is fixed horizontally on the rear side from the spindle motor 39 in the shallow groove 25 of the lift frame 16. The optical pickup 41 has a carriage 44 on which an objective lens 42 and light reflection type skew sensor 43 are fixed upward vertically, and an optical block 45 for transmitting a laser beam to the objective lens is fixed combinedly on the side of the carriage 44.

A carriage moving mechanism 47 for moving linearly the carriage 44 in the direction of the arrows $a_1$ and $a_2$ along a pair of right and left guide shafts 46 is fixed on the lift frame 16, and the carriage moving mechanism 47 is provided with a pinion 50 which is rotationally driven forward-reversibly by a carriage driving motor 48 with interposition of a gear train 49 and a rack 51 fixed on one side of the carriage 44 which rack 51 is driven linearly by the pinion 50. The spindle motor 39 and the objective lens 42 are disposed on the tray center $P_1$, and the mechanism is structured so that the objective lens is moved in the direction of the arrows $a_1$ and $a_2$ along the tray center $P_1$.

A disc chucking device 61 for chucking an optical disc 1 on the disc table 40 has a structure described herein under.

In detail, a pulley support member 62 formed of synthetic resin is spanned between the top ends of the right and left side plates 14a of the chassis 14 across the upper space of the disc tray 2, and a chucking pulley 63 formed of synthetic resin in the form of disc is held horizontally in a circular hole 64 formed at the position just above the disc table 40 and at the center position of the pulley support member 62 movably in the vertical and horizontal direction within a certain range. A horizontal pillow block 62a for supporting the horizontal flange 63a formed combinedly to the periphery of the upper edge of the chucking pulley 63 thereon is formed combinedly to the periphery of the circular hole 64 of the pulley support member 62. A disc magnet 65 is embedded at the center of the chucking pulley 63. A top cover 26 consisting of magnetic material such as metal plate is attached across the pulley support member 62 in the upper space of the chassis 14.

Therefore, when a disc is loaded, the chucking pulley 63 is lowered downward to the space under the pulley support member 62 with the dead load as shown in FIG. 15, the flange 63a of the chucking pulley 63 is hung in contact with the top of the pulley pillow block 62a of the pulley support member 62, the optical disc 1 is placed horizontally in the pit 3 of the disc tray 2, and the optical disc 1 is loaded horizontally in the direction of the arrow $a_1$ into the optical disc drive 5 by the disc tray 2. After loading, as shown in FIG. 1, when the lift frame 16 is lifted in the direction of the arrow $c_1$ up to the upper horizontal position, the disc table 40 is inserted upward from the bottom aperture 8 of the disc tray 2, and a center ring guide 40a of the disc table 40 is engaged upward into the center hole 1a of the optical disc 1. The optical disc 1 is lifted upward in the direction of the arrow $b_1$ in the pit 3 of the disc tray 2, simultaneously the chucking pulley 63 is lifted upward in the direction of the arrow $b_1$ together with the optical disc 1, and the flange 63a is lifted upward to the space above the pulley pillow block 62a of the pulley support member 62, when, the chunking pulley 63 chucks the optical disc 1 horizontal on the disc table 40 from the direction of the arrow $b_2$ by means of magnetic attraction of the magnet 65 of the chucking pulley 63 to the disc table 40.

The spindle motor 39 rotates the optical disc 1 at high speed in response to a recording and/or reproducing command signal supplied from the host computer, the carriage 44 of the optical pickup 41 is moved in the direction of the arrows $a_1$ and $a_2$ by the carriage moving mechanism 47, and the objective lens 42 is moved in the direction of the arrows $a_1$ and $a_2$ along the tray center $P_1$. A laser beam emitted from the optical block 45 irradiated onto the bottom face of the optical disc 1 through the objective lens 42, and the reflective beam is received by the optical block 45 through the objective lens 42, thereby the data of the optical disc 1 is recorded and/or reproduced.

The pinion 50 which is driven forward-reversibly by the carriage driving motor 48 with interposition of the gear train 49 drives linearly the rack 51, thereby the carriage moving mechanism 47 moves the carriage 44 in the direction of the arrows $a_1$ and $a_2$ along the pair of right and left guide shafts 46. The lift frame 16 is lowered in the direction of the arrow $c_2$ up to the lower position in response to an unloading command signal supplied from the host computer as shown in FIG. 15, and the disc table 40 is isolated downward from the optical disc 1 and the chucking pulley 63, thereafter the optical disc 1 is placed horizontally in the pit 3 of the disc tray 2, and the optical disc 1 is unloaded horizontally in the direction of the arrow $a_2$ to the outside of the optical disc drive 5 by the disc tray 2. When, the flange 63a of the chucking pulley 63 is brought into a contact with the pulley pillow block 62a of the pulley support member 62 in the direction of the arrow $b_2$ and brought to a stop when the disc table 40 is lowered in the direction of the arrow $c_2$, as the result, the disc table 40 is separated forcedly from the chucking pulley 63 against magnetic attraction force of the magnet 65.

In the exemplary chucking device 61 of the previously applied invention, as shown in FIG. 15, when an optical disc 1 is loaded or unloaded horizontally in the direction of the arrows $a_1$ and $a_2$ by the disc tray 2, the chucking pulley 63 is lowered to the space beneath the pulley support member 62 with the dead load and the flange 63a of the chucking pulley 63 is hung in a contact with the top of the pulley pillow block 62a of the pulley support member 62, therefore when an optical disc 1 is loaded or unloaded, a clearance L should be secured between the bottom surface of the hung chucking pulley 63 and the top surface of the optical disc 1 placed horizontally in the pit 3 of the disc tray 2 so that the optical disc 1 does not interfere with the chucking pulley 63. Therefore, in the example of an optical disc drive of the previously applied invention, when an optical disc 1 is loaded or unloaded, in order to secure further a clearance L between the chucking pulley 63 and the optical disc 1 in the state that the chucking pulley 63 is lowered from the pulley support member 62 by the clearance $L_2$, a large space namely $L_1+L_2$ is necessary between the pulley support member 62 and the top surface of the optical disc 1, as the result, the space causes the large total thickness T of the optical disc drive 5, and the large thickness is a problem.

In the exemplary disc chucking device 61 of the previously applied invention, the circular hole 64 is formed at the center of the pulley support member 62 provided horizontally beneath the top cover 26 across over the chassis 14, and the chucking pulley 63 is pressed in the circular hole movably in the vertical and horizontal direction within a certain range, the pulley support member 62 supports the periphery of the chucking pulley 63.

On the other hand, two types of use of optical disc drive 5 of this sort have been practically employed. One is the horizontal type in which the apparatus is placed horizontally on a desk for using and the other is the vertical type in which the apparatus is placed vertically on a desk for using. In particular, in the case of the vertical use, when an optical disc 1 is loaded or unloaded by the disc tray 2, the optical disc 1 moved toward the chucking pulley 63 from the disc tray 2 (shifted horizontally), and the top surface of the optical disc 1 (the side facing to the chucking pulley) can happen to be in contact with the chucking pulley 63 and the pulley support member 62. If the top surface of the optical disc 1 contacts with the pulley support member 62 fixed to the chassis 14, a scratch is caused on the top surface of the optical disc 1 due to a large contact resistance. Particularly in the case of an optical disc 1 for DVD (digital video disc) having information on both top and bottom surfaces, if scratching is caused on the top information recorded surface due to contact with the pulley support member 62, then the information can be impossible to be recorded and/or reproduced, this is a serious problem.

SUMMARY OF THE INVENTION

The present invention has been accomplished in order to solve the above-mentioned problem, it is the object of the present invention to provide a disc chucking device of an optical disc drive for eliminating occurrence of scratching due to a contact of the top surface of an optical disc with a pulley support member even if the optical disc is lifted part from a disc tray when the optical disc is loaded or unloaded in the case that the optical disc drive is in vertical use.

To achieve the above-mentioned object, the disc chucking device of an optical disc drive of the present invention is provided with a first magnetic attraction means for drawing down a chucking pulley to the disc table side when the disc table is lifted from the lower position to the upper position after an optical disc is loaded, and a second magnetic attraction means for drawing up the chucking pulley from the pulley support member when the disc table is drawn down from the upper position to the lower position to unload the optical disc, and further the pulley support member is structured with a centering guide which supports the center of the chucking pulley.

Because the disc chucking device of an optical disc drive of the present invention having the structured described herein above is capable of keeping the chucking pulley above the pulley support member using the second magnetic attraction means in unloading state of an optical disc, the optical disc will not receive interference from the chucking pulley when the disc tray loads the optical disc. Because the chucking pulley can be drawn down strongly toward the pulley support member by the first magnetic attraction means when the disc table is lifted from the lower position to the upper position after loading of the optical disc, the optical disc can be chucked strongly on the disc table by the chucking pulley. On the other hand, because the chucking pulley can be kept above the pulley support member when the optical disc is unloaded, the clearance to be secured in unloading between the chucking pulley and the optical disc is reduced to a clearance $L_8$ which is sufficiently smaller than $L_1+L_2$ in the previously applied invention. Because the pulley support member is structured with the centering guide which supports the center of the chucking pulley, the top surface of the optical disc is prevented from being scratched due to contact with the centering guide even if the optical disc is lifted far apart from the disc tray when the optical disc is loaded and unloaded in the case that the optical disc drive is placed vertically for use.

DETAILED DESCRIPTION OF THE PREFERRED EMBODIMENTS

Figure 1:
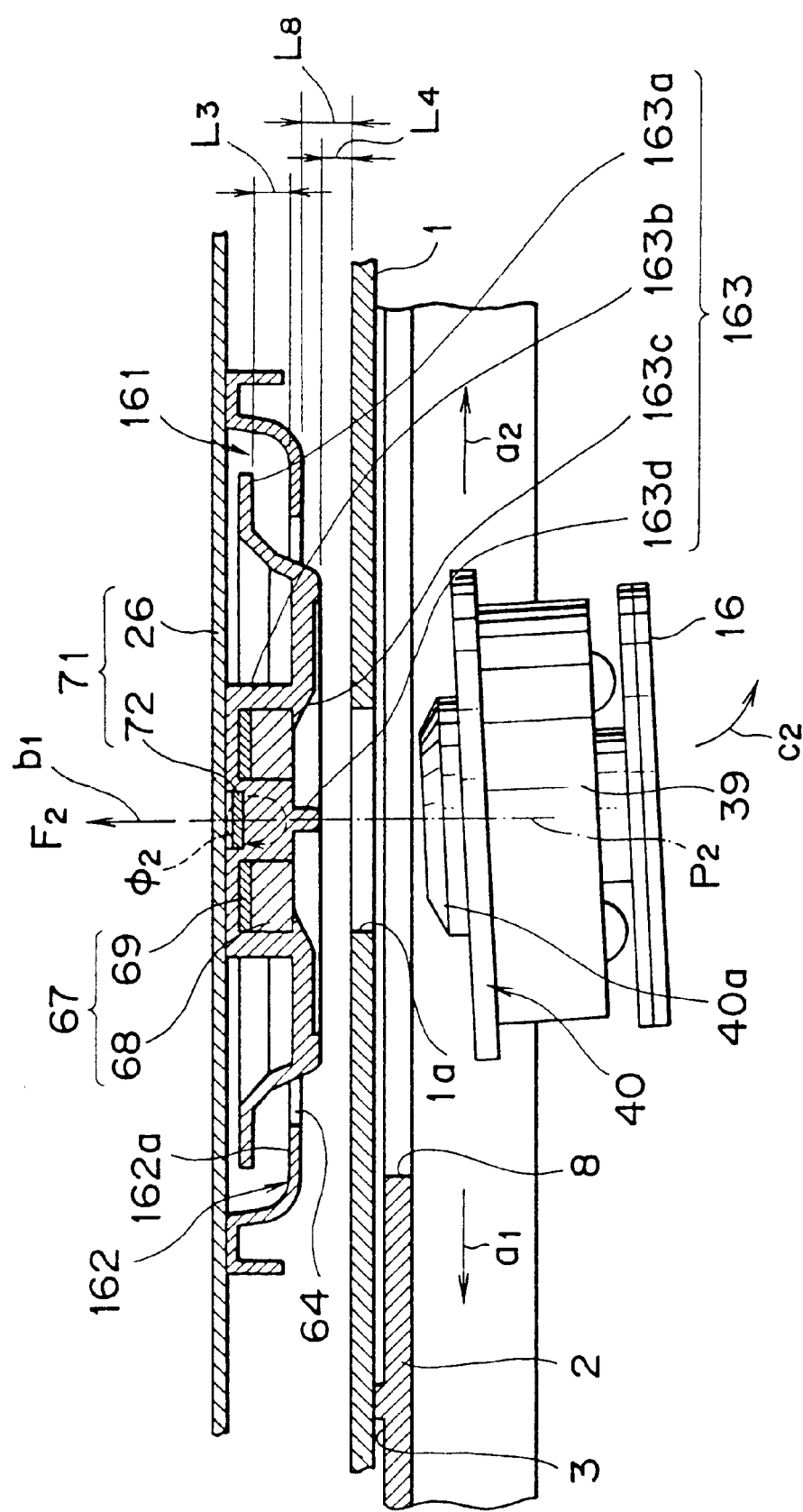
FIG. 1 is an enlarged partial cross sectional side view in unloading operation for illustrating the first embodiment of a disc chucking device of an optical disc drive in accordance with the present invention.

Embodiments of a disc chucking device of an optical disc drive in accordance with the present invention will be described in detail hereinafter with reference to FIGS. 1 to 7. The same components as shown in FIGS. 11 to 18 are given the same characters as shown in FIGS. 1 to 7, and duplicated description is omitted.

First Embodiment of a Disc Chucking Device

A disc chucking device of the first embodiment of the present invention will be described with reference to FIGS. 1 to 5.

In detail, the disc chucking device 161 is provided with the first magnetic attraction means 67 for drawing down a chucking pulley 163 in the direction of the arrow $b_2$ with a strong magnetic attraction force in the direction of the arrow $b_2$ to the space beneath the pulley support member 162, and the second magnetic attraction means 71 for drawing up the chucking pulley 163 with a weak magnetic attraction force in the direction of the arrow $b_1$ to the space above the pulley support member 162.

The first magnetic attraction means 67 comprises the first magnet 68 and the first yoke 69 formed in the ring shape having the same diameter, the first yoke 69 is placed horizontally on the top surface of the first magnet 68 in close contact, and the first magnet 68 and the first yoke 69 which are in close contact are embedded horizontally and co-axially on the periphery of the center $P_2$ at the center portion 163b of the chucking pulley 163. The second magnetic attraction means 71 is composed of the disc-shaped second magnet 72 having a smaller diameter than that of the first magnet 68, the second magnet 72 is embedded horizontally at the center $P_2$ of the central portion 163b of the chucking pulley 163 at the level higher than the first yoke 69.

The magnetic attraction, namely the magnetic force, of the first magnet 68 is strengthened by magnetizing the first magnet 68 to have S namely the S pole and N namely the N pole on both ends of the first magnet 68 in the diametrical direction f. On the other hand, the magnetic attraction force of the second magnet 72 is structured so as to be weaker than the magnetic attraction force of the first magnet 68. A magnetic attraction target of the first magnetic attraction means 67 consists of metal magnetic material such as stainless steel, and this target is a disc table 40 disposed beneath the chucking pulley 163. A magnetic attraction target of the second magnetic attraction means 71 consists of magnetic material such as metal plate, and the top cover 26 fixed horizontally above the chucking pulley 163 functions also as the magnetic attraction target. A conical trapezoid center pit 163c having a larger diameter than that of the center ring guide 40a of the disc table 40 is formed on the bottom side of the center portion 163b of the chucking pulley 163, a center pin 163d is formed combinedly downward vertically at the center $P_2$ of the center pit 163c, and a center hole 40b is formed at the center $P_2$ of the center ring guide 40a of the disc table 40.

Figure 4:
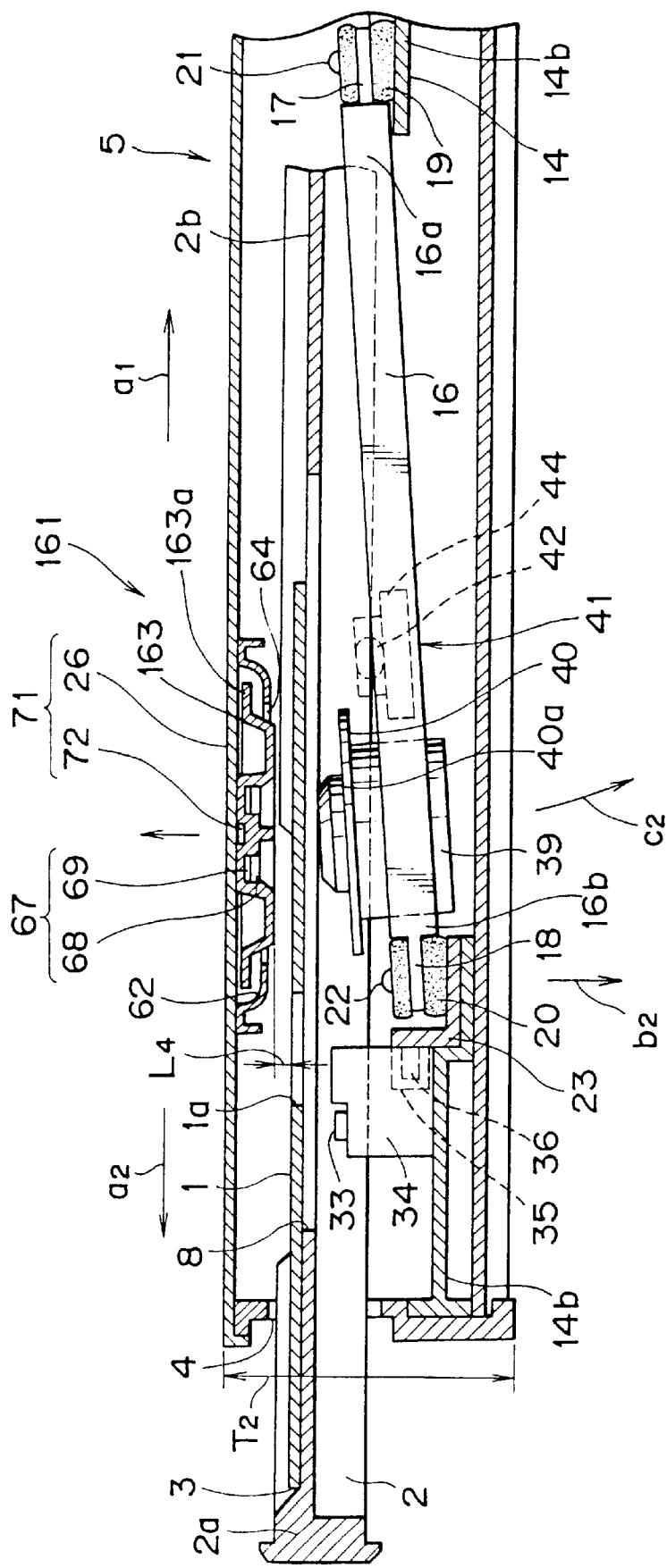
FIG. 4 is a cross sectional side view in unloading operation of the whole optical disc drive shown in FIG. 1.

The first embodiment of the disc chucking device 161 of the present invention is structured as described herein above, as shown in FIG. 1 and FIG. 4, in unloading operation of the optical disc 1, a magnetic attraction force $F_2$ which is directed upward namely in the direction of the arrow $b_1$ generated by a magnetic flux $\phi_2$ having a low magnetic flux density is generated between the second magnet 72 of the second magnetic attraction means 71 and the top cover 26 consisting of magnetic material, and the weak magnetic attraction force $F_2$ draws up the chucking pulley 163 in the direction of the arrow $b_1$ to the space above the support member 162. When, the chucking pulley 163 has been lifted in the direction of the arrow $b_1$ by a distance of clearance $L_3$ from the pulley support member 162, and a clearance $L_4$ is formed between the bottom surface of the chucking pulley 163 and the top surface of the optical disc 1 placed horizontally on the disc tray 2.

Figure 2:
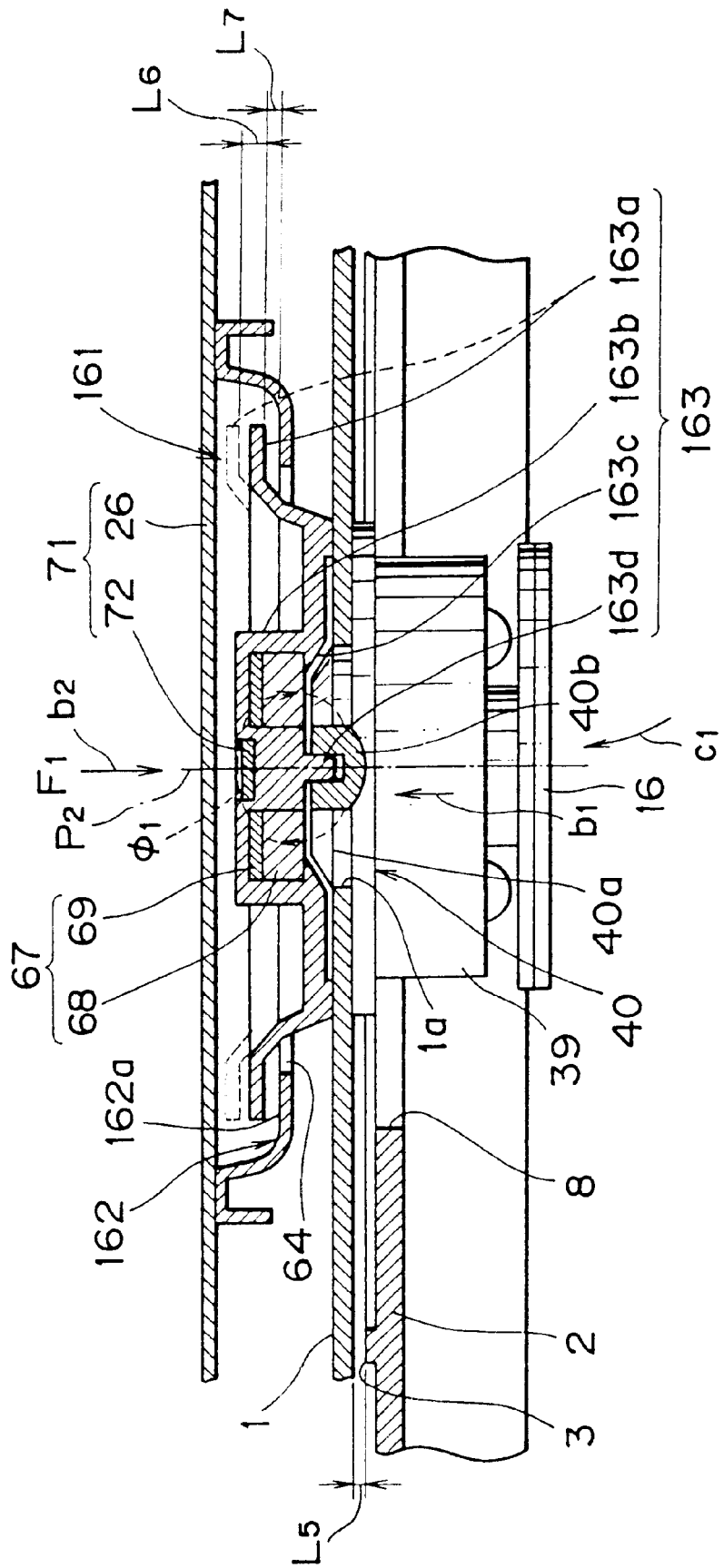
FIG. 2 is an enlarged partial cross sectional view in disc chucking operation of the disc chucking device shown in FIG. 1.
Figure 3:
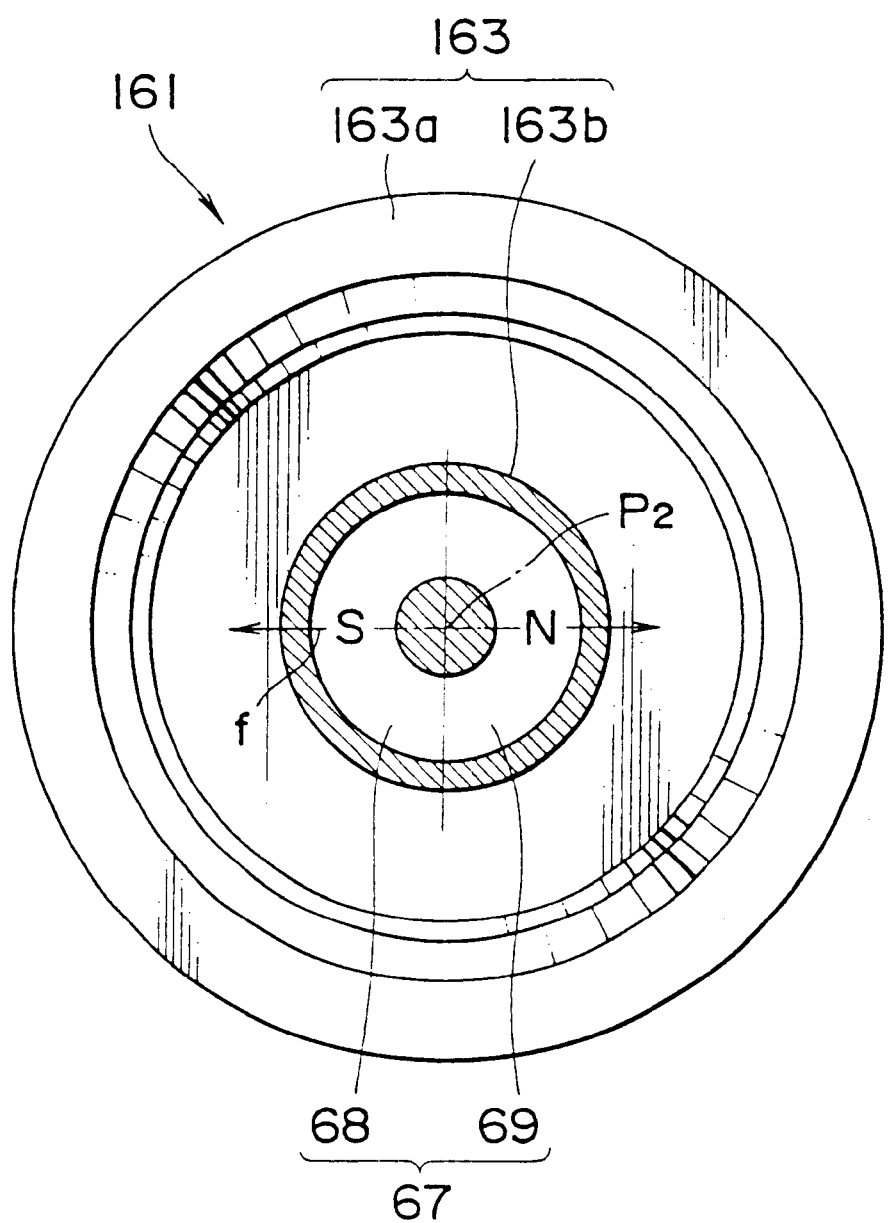
FIG. 3 is a partially cut away plan view of a chucking pulley of the disc chucking device shown in FIG. 1.
Figure 5:
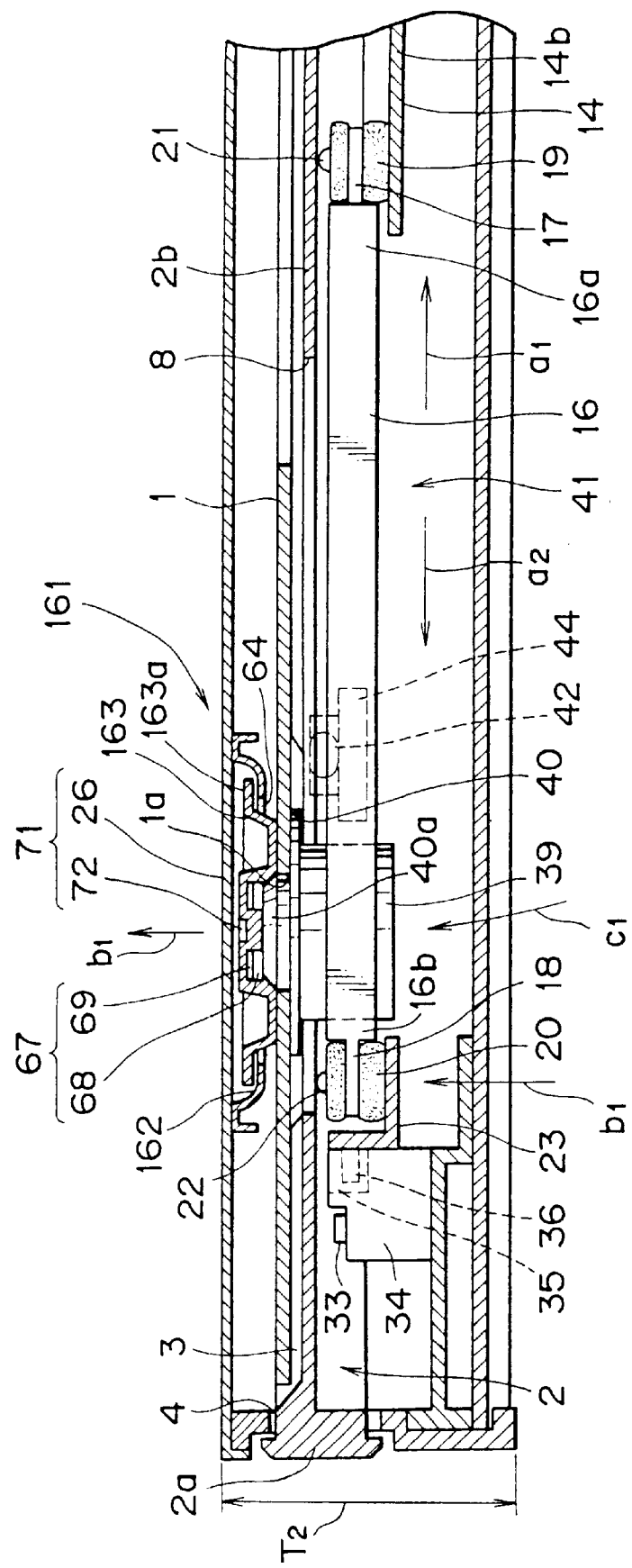
FIG. 5 is a cross sectional side view in disc chucking operation of the whole optical disc drive shown in FIG. 1.

Therefore, as shown in FIG. 1 and FIG. 4, in loading operation of the optical disc 1, the optical disc 1 is loaded horizontally from the direction of the arrow $a_1$, in the optical disc drive 5 by the disc tray 2, when, the optical disc 1 is loaded safely without any interference of the chucking pulley 163 due to the existence of the clearance $L_4$. After loading of the optical disc 1, as shown in FIG. 2 and FIG. 5, when the spindle motor 39 and the disc table 40 are lifted together in the direction of the arrow $c_1$ from the lower position to the upper position and come up to the horizontal position, the center ring guide 40a of the disc table 40 is engaged into the center hole 1a of the optical disc 1 supportingly, the optical disc 1 is moved apart by the clearance $L_5$ in the direction of the arrow $b_1$ in the pit 3 of the disc tray 2 by the disc table 40, the center hole 40b of the center ring guide 40a is engaged to the center pin 163d of the chucking pulley 163 from the direction of the arrow $b_1$.

When, the center ring guide 40a of the disc table 40 consisting of magnetic material takes an access to the first magnet 68 of the first magnetic attraction means 67, and a strong magnetic attraction force $F_1$ generated by magnetic flux $\phi_1$ between the first magnet 68, first yoke 69, and the centering guide 40a is generated downward in the direction of the arrow $b_2$. The magnetic attraction force $F_1$ of the first magnetic attraction means 67 is a strong magnetic attraction force $F_1$ which is stronger than the second magnetic attraction means 71, therefore, the chucking pulley 163 is drawn down by the clearance $L_6$ in the direction of the arrow $b_2$ to the space beneath the pulley support member 162, thereby, the optical disc 1 is chucked horizontally on the disc table 40 strongly and stably by the chucking pulley 163. In this chucking state of the optical disc 1, the flange 163a of the chucking pulley 163 is distant apart by the clearance $L_7$ above the pulley pillow block 162a of the pulley support member 162.

Because the optical disc 1 is chucked strongly on the disc table 40 as described herein above, even when the optical disc 1 is rotated at high speed by the disc table 40 of the spindle motor 39, the optical disc 1 does not slip and is rotated stably at high speed, the information is high density recorded and/or reproduced precisely at high speed rotation in the optical disc 1 such as DVD-ROM.

When the optical disc 1 is unloaded after recording and/or reproducing, as shown in FIG. 1 and FIG. 4, the disc table 40 is lowered together with the spindle motor 39 from the upper position to the lower position in the direction of the arrow $c_2$ by the lift frame 16, and the disc table 40 is moved apart from the optical disc 1 in the direction of the arrow $c_2$. When, the strong magnetic attraction force $F_1$ generated in the direction of the arrow $b_2$ between the chucking pulley 163 and the disc table 40 by the first magnetic attraction means 67 is shut down, the chucking pulley 63 is lifted again in the direction of the arrow $b_1$ to the position distant apart from the pulley support member 162 by the distance of the clearance $L_3$ by means of the weak magnetic attraction force $F_2$ generated in the direction of the arrow $b_1$ by means of the second magnetic attraction means 71, and the clearance $L_4$ is formed again between the bottom surface of the chucking pulley 163 and the top surface of the optical disc 1 on the disc tray 2. Therefore, when the optical disc 1 is unloaded horizontally in the direction of the arrow $a_2$ to the outside of the optical disc drive 5 by the disc tray 2, thereafter, the optical disc 1 is unloaded safely without any interference of the chucking pulley 163.

As described herein above, according to the disc chucking device 161 of the present invention, as shown in FIG. 1 and FIG. 4 for description of unloading operation of the optical disc 1, because the clearance $L_4$ is formed between the bottom surface of the chucking pulley 163 and the top surface of the optical disc 1 in the state that the chucking pulley 163 is kept drawn up by a distance of the clearance $L_3$ in the direction of the arrow $b_1$ to the position from the position of the pulley support member 62 by the weak magnetic attraction force $F_2$ directed to the direction of the arrow $b_1$ by the second magnetic attraction means 71, and as the result as shown in FIG. 1, the clearance $L_8$ between the top surface of the optical disc 1 which is placed horizontally in the pit 3 of the disc tray 2 for loading and/or unloading and the bottom surface of the chucking pulley 163 can be reduced in comparison with the clearance $L_1+L_2$ in the previously applied invention by the clearance $L_3$, which is the drawn up distance of the chucking pulley 163 from the pulley support member 162. Because the relation between clearances is represented by $L_8<L_1+L_2$ in those structures as described herein above, the thickness $T_2$ of the whole optical disc drive can be reduced by the clearance $L_3$ in comparison with the thickness $T_1$ in the previously applied invention. In other words, $T_2=T_1-L_3$. Use of the top cover 26 also as the magnetic member of the second magnetic attraction means 71 leads to the reduced cost due to reduction of the number of component parts and fabrication man-hour, and leads to the realization of the thinned optical apparatus as a whole.

According to the disc chucking device 161 of the present invention, as shown in FIG. 2 and FIG. 5, after loading of the optical disc 1, the first magnetic attraction means 67 which magnetically attracts the chucking pulley 163 in the direction of the arrow $b_2$ to the disc table 40 side comprises the first ring magnet 68 and the first ring yoke 69 which is in close contact horizontally with the top surface of the first magnet 68, and the first magnet 68 is magnetized to have S namely S-pole and N namely N-pole on both ends of the first magnet 68 in the diametrical direction f, thereby, the strong magnetic attraction force is generated consistently with least leakage magnetic flux between the first magnet 68 and the centering guide 40a of the disc table 40. Therefore, the magnetic attraction force $F_1$ of the first magnetic attraction means 67 is served as a strong magnetic attraction force which is stronger consistently than the magnetic attraction force $F_2$ of the second magnetic attraction means 71, the strong magnetic attraction force $F_1$ draws down strongly the chucking pulley 163 in the direction of the arrow $b_2$, and as the result, the optical disc 1 is chucked strongly and stably on the disc table 40 horizontally.

The first and second magnets 68 and 72 which are independent each other are provided to the first and second magnetic attraction means 67 and 71 respectively, and the magnetic flux of the first and second magnets 68 and 72 are adjusted, thereby, the magnetic attraction forces $F_1$ and $F_2$ are adjusted simply and without any restriction, therefore, the chucking operation after loading of the optical disc 1 and drawing up operation of the chucking pulley 163 for unloading of the optical disc 1 are performed consistently.

Second Embodiment of Disc Chucking Device

Figure 6:
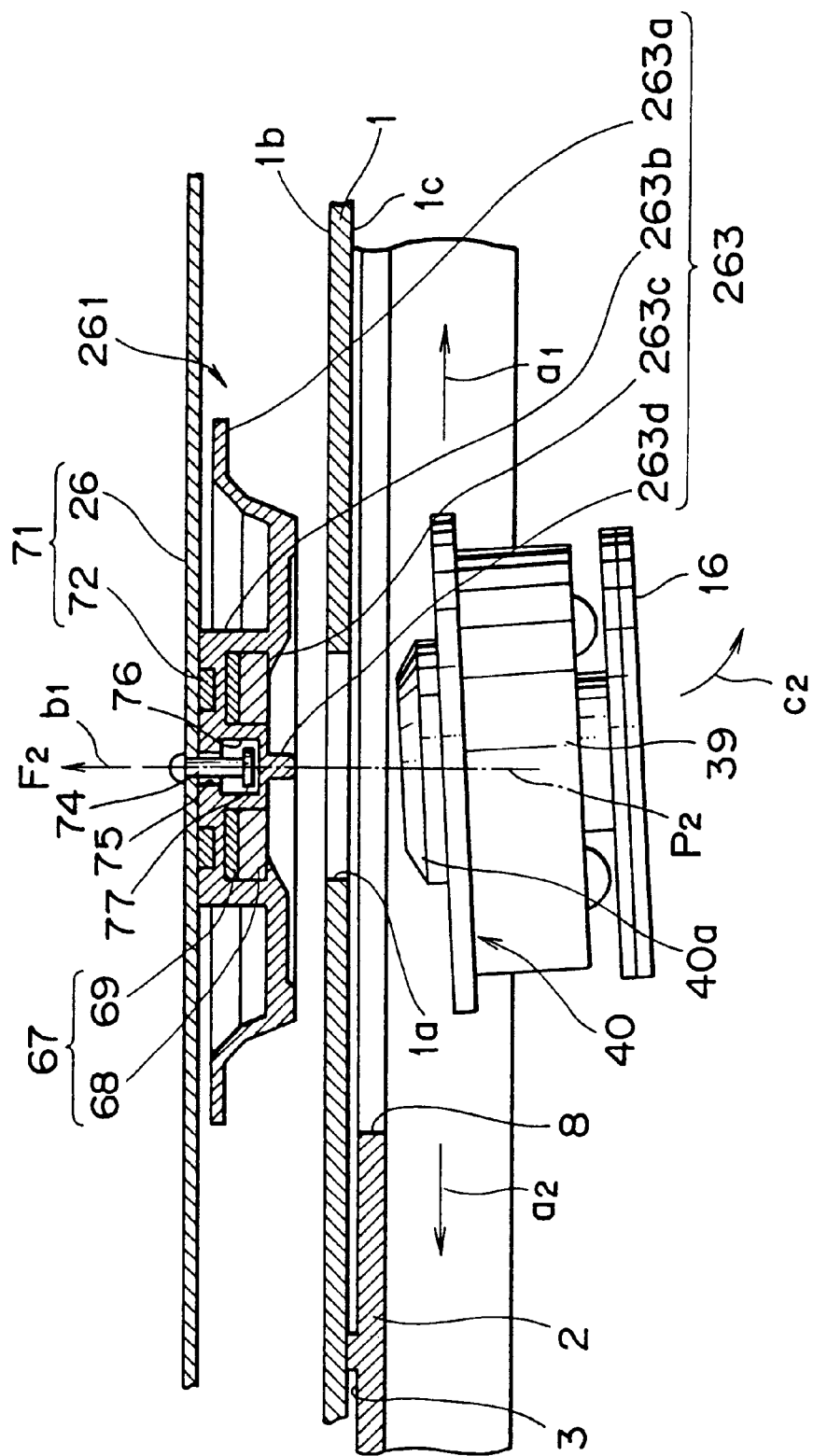
FIG. 6 is an enlarged partial cross sectional side view in unloading operation for illustrating the second embodiment of a disc chucking device of an optical disc drive in accordance with the present invention.

Next, the second embodiment of the disc chucking device of the present invention will be described with reference to FIG. 6 and FIG. 7.

In detail, in the disc chucking device 261 of the present invention, the centering pin 74 which extends downward from the top cover 26 forms the centering member, and the centering member forms the pulley support member. The top end of the centering pin 74 is fixed to the top cover 26, and the bottom end side of the centering pin 74 which extends downward from the top cover 26 is inserted into the center hole 75 formed at the center of the top surface of the chucking pulley 263. A large diameter hole 76 is formed under the center hole 75 of the chucking pulley 263, and a slip down preventing flange 77 is formed on the periphery of the bottom end of the centering pin 74. The diameter of the centering pin 74 relative to the diameter of the center hole 75, the diameter of the large hole 76 relative to the diameter of the flange 77, and the vertical depth of the large diameter hole 76 relative to the vertical thickness of the flange 77 are made large sized, thereby, the chucking pulley 263 is supported by the centering pin 74 movable as desired in the vertical and horizontal direction in a certain range. The second magnet 72 having weak magnetic attraction is embedded co-axially on the periphery of the center hole 75 on the top surface of the chucking pulley 263.

As described herein above, in the second embodiment of the disc chucking device of the present invention, the centering pin 74 which is a component of the pulley support member supports the center of the chucking pulley 263, therefore, in the case that the optical disc drive 5 is placed vertically on a desk for use, when the optical disc 1 is loaded and/or unloaded, the optical disc 1 is lifted far apart upward (to chucking pulley side) from the disc tray 2, as the result, possible contact of the top surface 1b of the optical disc 1 with the chucking pulley 263 will not cause contact of the top surface 1b of the optical disc 1 with the centering pin 74 which is fixed to the top cover 26, and thus does not cause any scratching on the top surface. Possible contact of the top surface of the optical disc 1 on the chucking pulley 263 seldom causes scratching on the top surface of the optical disc 1 because the chucking pulley 263 is formed of synthetic resin and the chucking pulley can move in the vertical and horizontal direction upon contact.

According to the second embodiment of the disc chucking device of the present invention, even in the case that an optical disc 1 such as DVD in which the information is recorded on both top and bottom sides is used, when the optical disc 1 is loaded and/or unloaded the top surface 1b of the optical disc 1 will not be scratched, not only on the bottom surface 1c but also on the top surface 1b of the optical disc 1, the information is recorded and/or reproduced highly precisely, and thus the optical disc drive 5 excellent in performance and reliability is realized.

Figure 7:
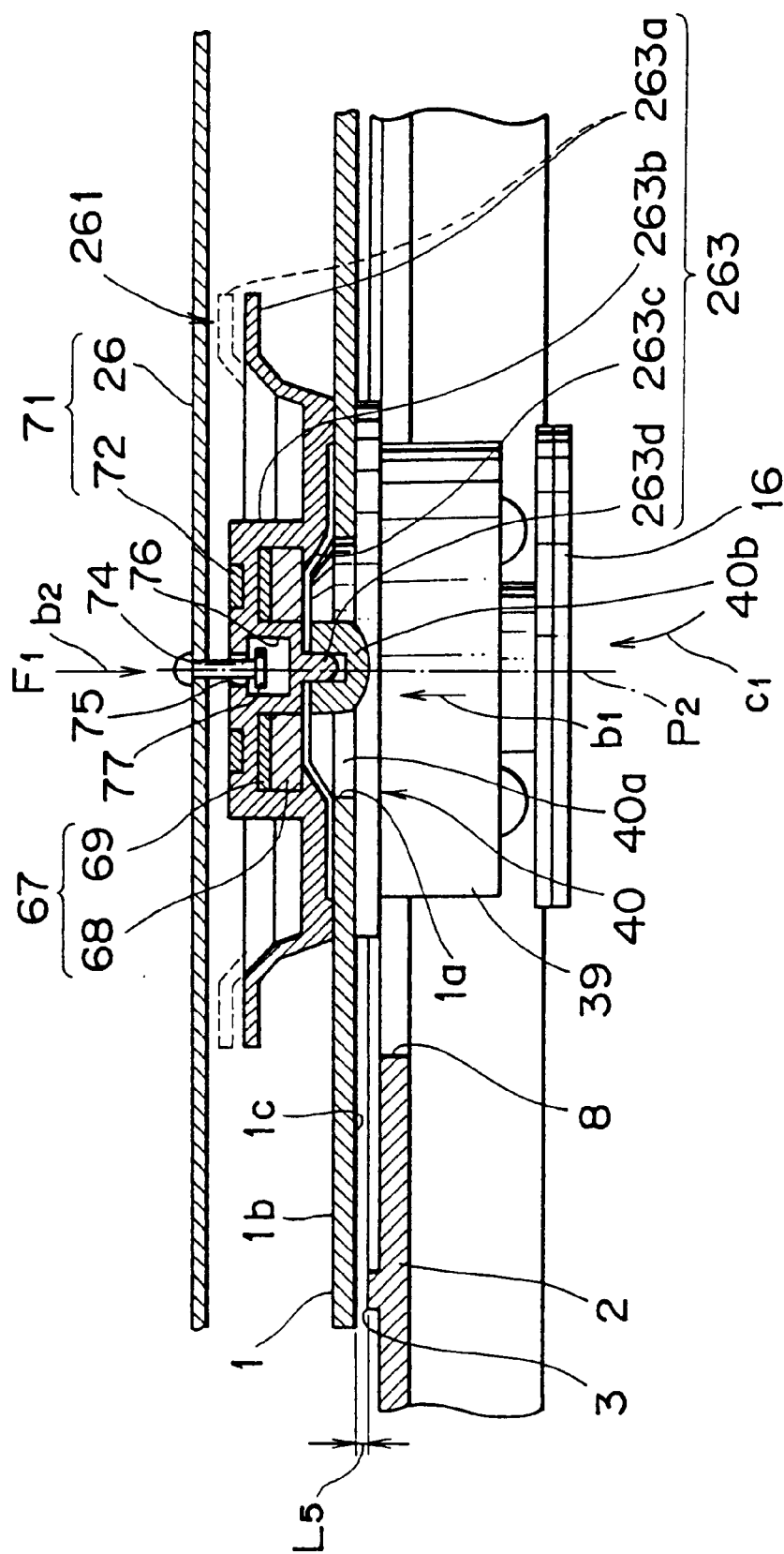
FIG. 7 is an enlarged partial cross sectional view in disc chucking operation of the disc chucking device shown in FIG. 6.

Further, when the optical disc 1 is chucked as shown in FIG. 7, because of centering effect of the chucking pulley 63 due to the centering pin 74, the center pin 263d of the chucking pulley 263 is engaged into the center hole 40a of the disc table 40 smoothly and consistently, and as the result centering of the chucking pulley 63 to the disc table 40 is ensured. Therefore, the eccentric load due to deviation from the axis of the chucking pulley will not be generated, the optical disc 1 is rotated stably, and the information is recorded and/or reproduced highly precisely.

Third Embodiment of Disc Chucking Device

Figure 8:
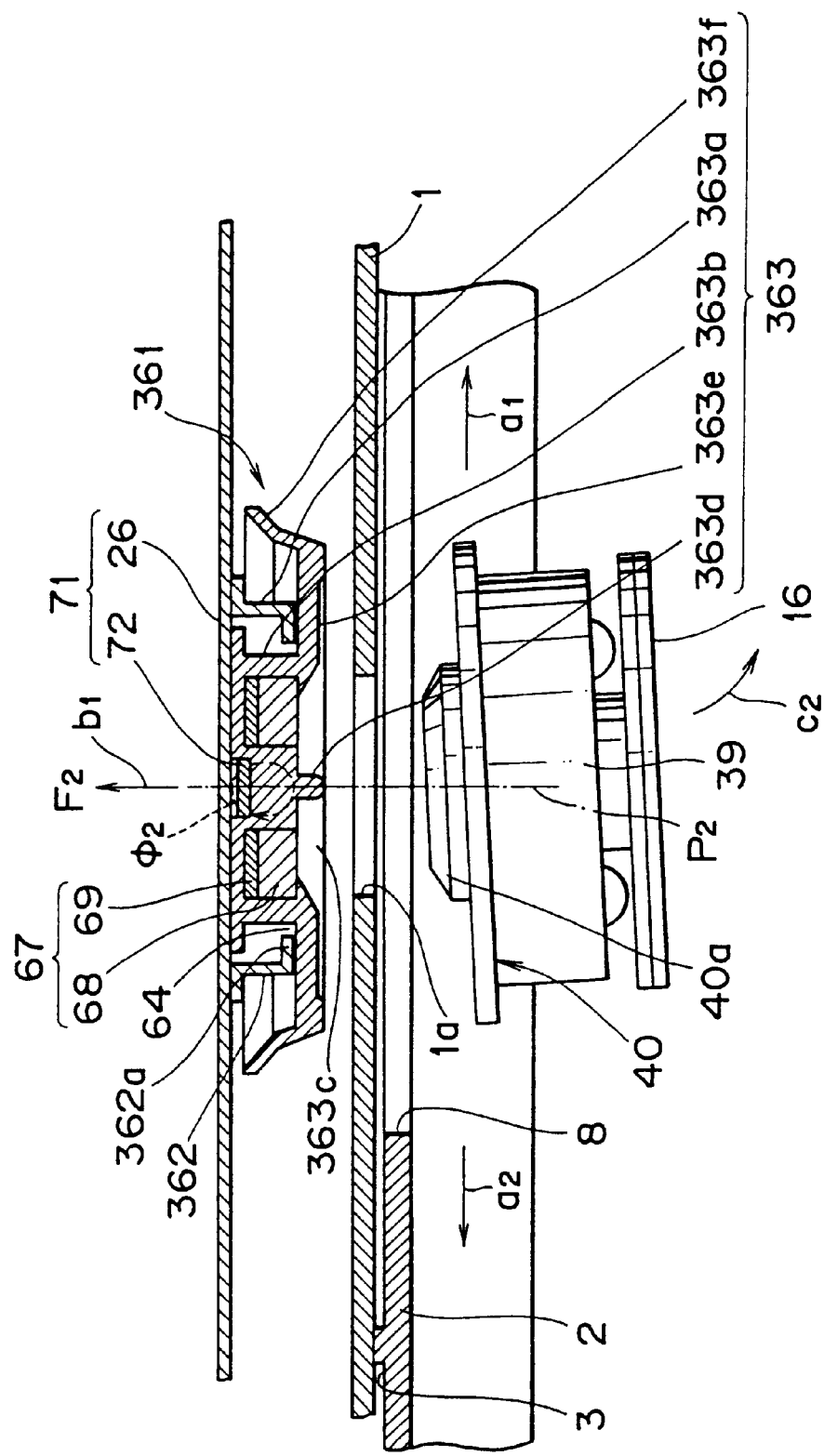
FIG. 8 is a cross sectional side view for illustrating the third embodiment of a disc chucking device of an optical disc drive in accordance with the present invention.

Next, the third embodiment of the disc chucking device of the present invention will be described with reference to FIG. 8.

In detail, in the disc chucking device 361 of the present invention, the chucking pulley 363 is formed of synthetic resin, and the cylindrical center portion 363b having embedded first and second magnets 68 and 72 and first yoke 69, a disc-shaped disc crimp plate 363e formed horizontally on the periphery of the bottom end of the center portion 363b, a cylindrical peripheral wallportion 363f which rises upward from the periphery of the disc crimp plate 363e, and a disc-shaped flange having a small diameter provided inside the peripheral wall portion 363f formed horizontally on the periphery of the top end of the center portion 363b are formed combinedly with the chucking pulley 363.

The pulley support member 362 made of plate metal having a small diameter is attached on the bottom surface of the top cover 26 made of plate metal, the pulley pillow block 362a formed horizontally inside the bottom end of the pulley support member 362 is inserted in the inside of the peripheral wall portion 363f of the chucking pulley 363 to dispose it beneath the flange 363a, the center portion 363b of the chucking pulley 363a is engaged with allowance in the vertical and horizontal direction in the circular hole 64 formed inside the pulley pillow block 362a, and the pulley support member 62 supports the chucking pulley 63 movable in the vertical and horizontal direction within a certain range.

According to the disc chucking device 361 of the present invention, because the chucking pulley 362 is supported by the pulley support member 62 inserted into the inside of the peripheral wall portion 363f, in the case that the optical disc drive 5 is placed vertically on a desk for using, when the optical disc 1 is loaded and/or unloaded, the optical disc 1 is lifted far apart to the pulley support member 362 side in the pit 3 of the disc tray 2, and even if the optical disc 1 happens to contact on the pulley support member 362 made of plate metal, the optical disc 1 is prevented from being in contact directly with the pulley support member 362 by the disc crimp plate 363e and the peripheral wall portion 363f which are formed combinedly with the checking pulley 363 made of synthetic resin and cover the under side and periphery of the pulley support member 362.

The optical disc 1 consists of synthetic resin, and if the pulley support member 362 is made of plate metal, and the optical disc 1 happens to contact directly with the pulley support member 362 fixed at the prescribed position, then the optical disc 1 is scratched strongly with the hard pulley support member 362 made of plate metal and the scratching causes easily a serious damage (large scratch is easily caused) on the optical disc 1.

However on the other hand, in the disc chucking device of the present invention, because the under side and periphery of the pulley support member 362 made of plate metal is covered by the disc crimp plate 363e and the peripheral wall portion 363f of the chucking pulley 363, direct contact of the optical disc 1 with the pulley support member 362 and resultant serious damage on the optical disc 1 is prevented, and high safety is secured. Because the pulley support member 362 has a small diameter and it is inserted in the inside of the peripheral wall portion 363f of the chucking pulley 363, as shown in FIG. 1 and FIG. 2, the space factor of the peripheral portion of the chucking pulley 363 in the inside of the optical disc drive 5 is improved, and the improved space factor is favorable for realizing a small-sized light-weight optical disc drive 5.

Fourth Embodiment of Disc Chucking Device

The fourth embodiment of the disc chucking device of the present invention will be described with reference to FIG. 9.

Figure 9A:
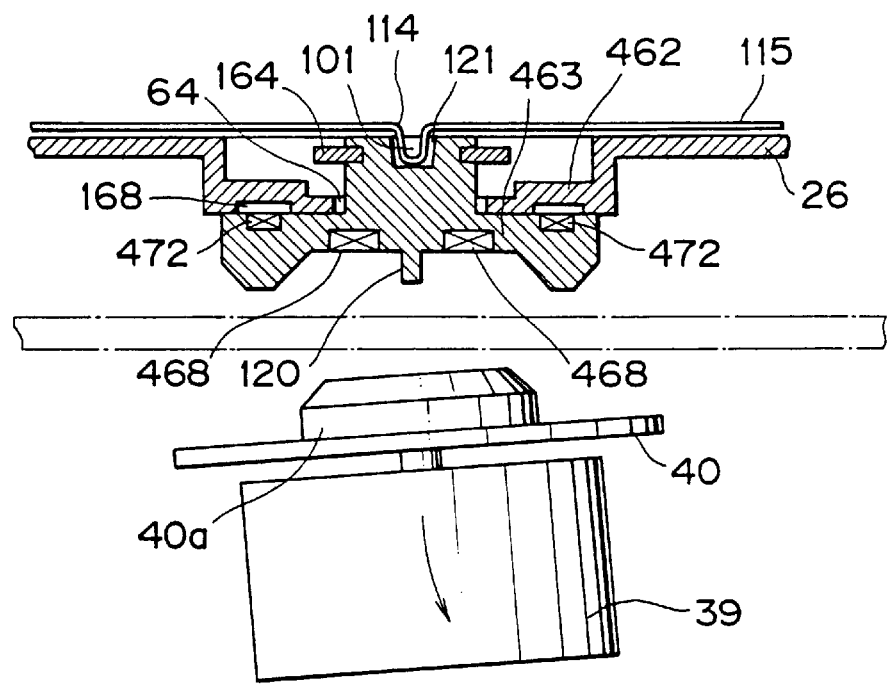
FIG. 9A and FIG. 9B are cross sectional views for illustrating the fourth embodiment of a disc chucking device of an optical disc drive in accordance with the present invention.

In the embodiment shown in FIG. 9, the top cover 115 consisting of magnetic material is formed combinedly with the clamp support member 462 formed in the form of cylindrical recess, the cylindrical center shaft 101 formed combinedly on the upper center of the disc clamp 463 is inserted through the circular hole 64 formed at the center of the clamp support member from the bottom to the top, and the stopper ring 164 attached horizontally on the periphery of the top end of the center shaft 101 is disposed above the clamp support member 462. The weak magnet 472 embedded in the form of ring on the top side of the disc clamp 463 and the clamp support member 462 which is a component of the yoke constitute a means for pressing upward the disc clamp 463 to the upper position, and the strong magnet 468 is embedded in the form of ring on the bottom side of the disc clamp 463. According to this embodiment, the weak magnetic attraction force exerted between the weak magnet 472 and the clamp support 462 lifts the disc clamp 463 to the position where the disc clamp 463 is brought into a contact with the bottom end of the clamp support member 462 when the optical disc 1 is unloaded.

The ring recess 168 is formed at the position which is facing to the magnet 472 on the bottom surface of the clamp support member 462 so that the magnet 472 is attracted to the clamp support member 462 with interposition of a space.

Figure 9B:
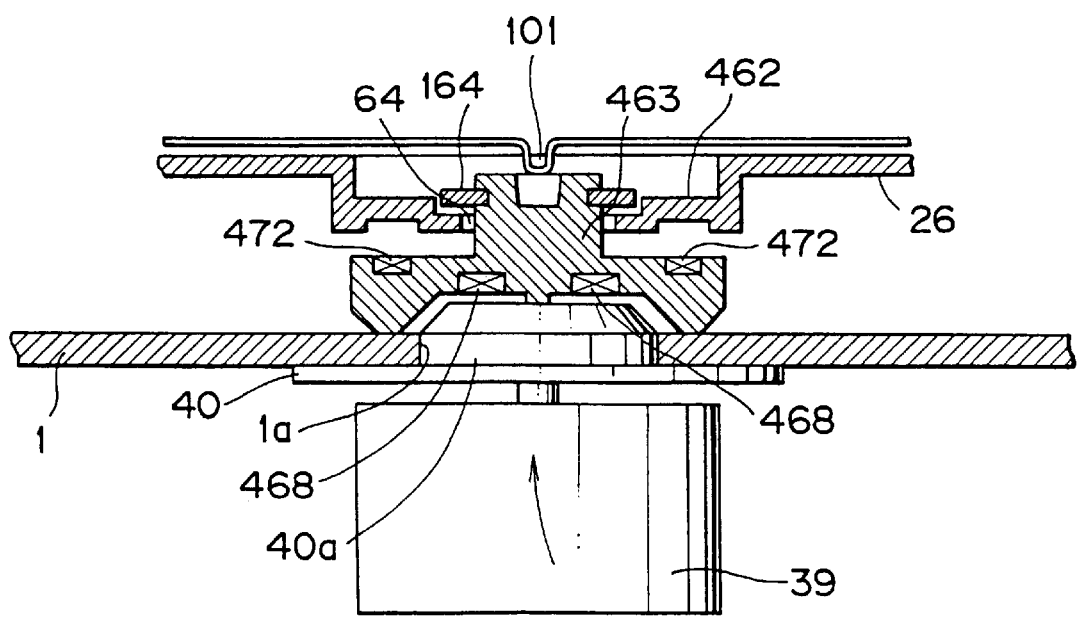

When the optical disc 1 is chucked as shown in FIG. 9(B), the strong magnetic attraction force exerted between the strong magnet 468 and the center ring guide 40a of the disc table 40 attracts the disc clamp 463 downward, and the disc clamp 463 chucks strongly the optical disc 1 on the disc table 40.

Also in the case of the disc clamp of this type, the projection guide 114 is provided to the above-mentioned cover 115, the recess guide groove 121 is provided above the clamp support member 462, and positioning is performed by the guide 114 and the guide groove 121 similarly.

Fifth Embodiment of Disc Chucking Device

Figure 10A:
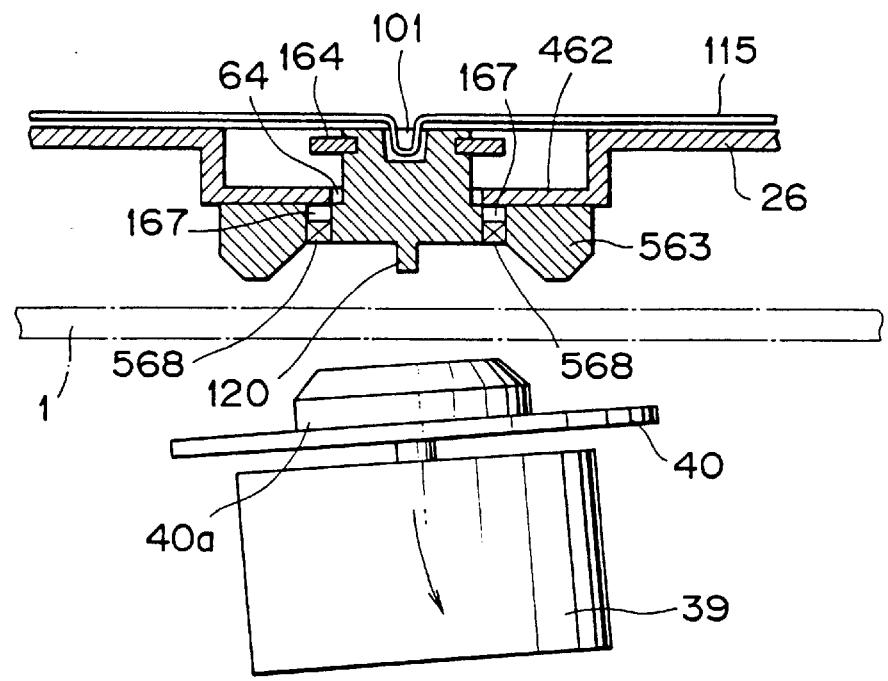
FIG. 10A and FIG. 10B are cross sectional views for illustrating the fifth embodiment of a disc chucking device of an optical disc drive in accordance with the present invention.
Figure 10B:
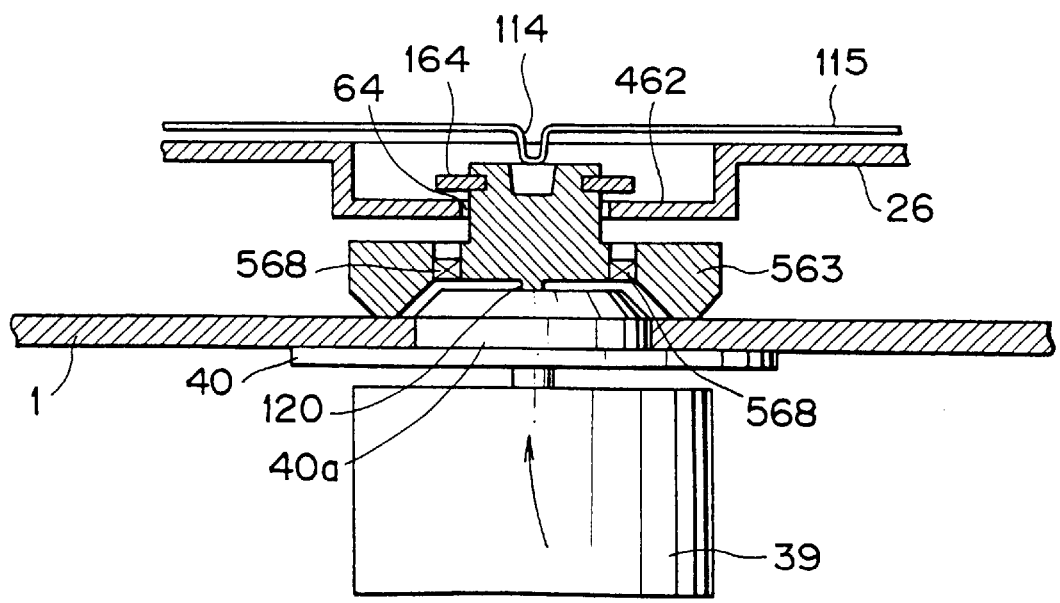
Figure 11:
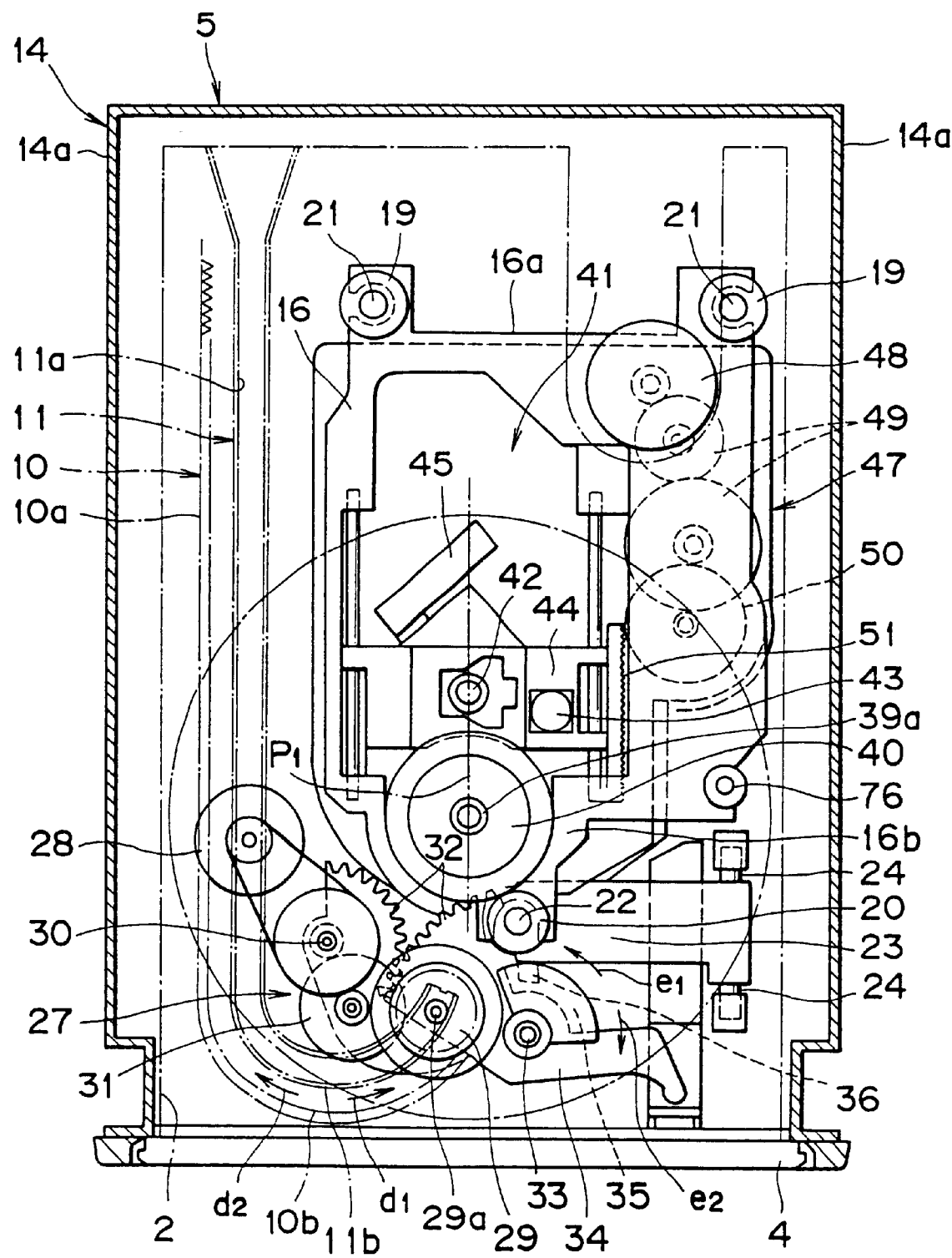
FIG. 11 is a partially cut away plan view for illustrating an optical disc drive in accordance with the previously applied invention.
Figure 12:
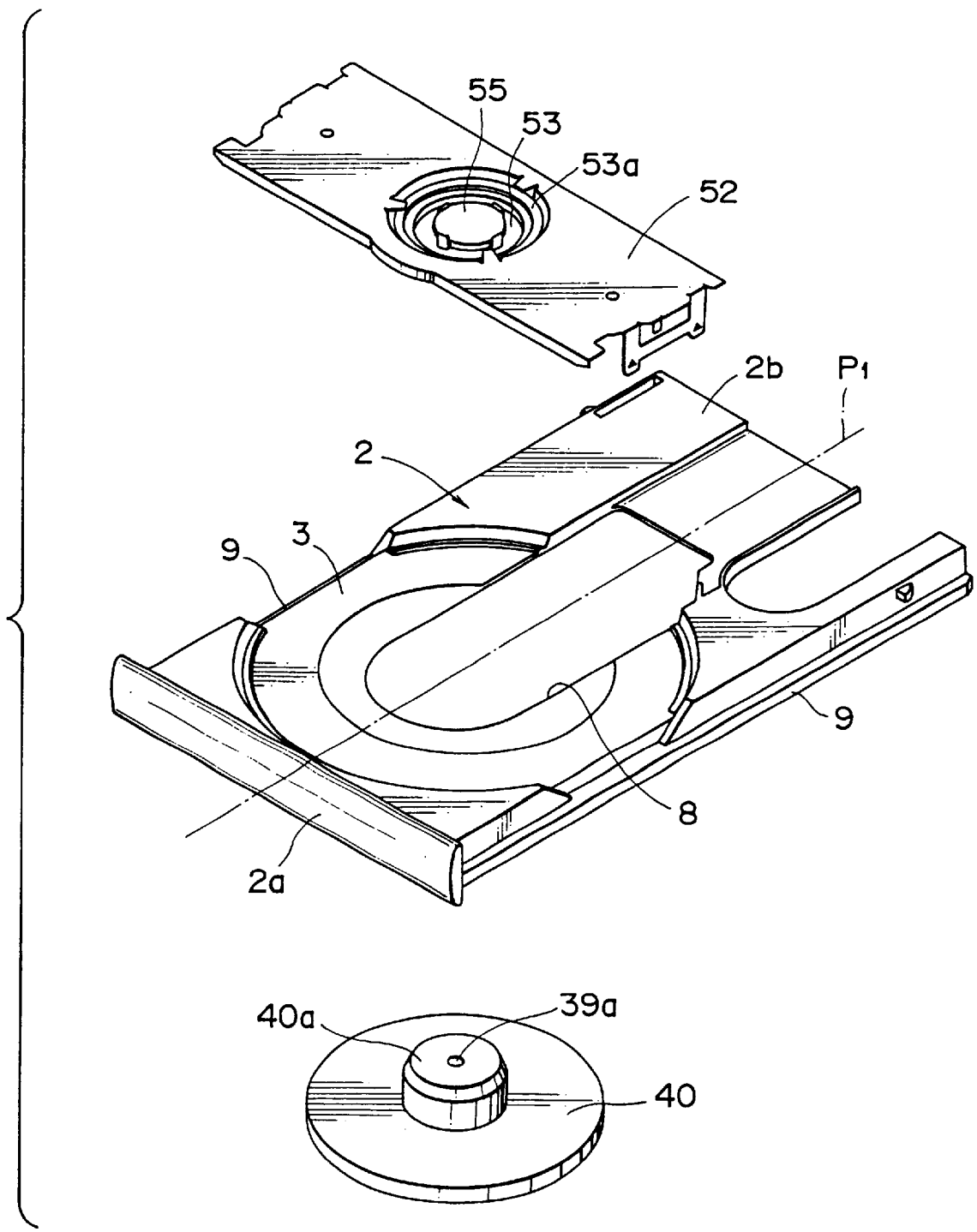
FIG. 12 is an exploded perspective view for illustrating a chucking pulley, clamp support plate, disc tray, and disc table of the optical disc drive in accordance with the previously applied invention.
Figure 13:
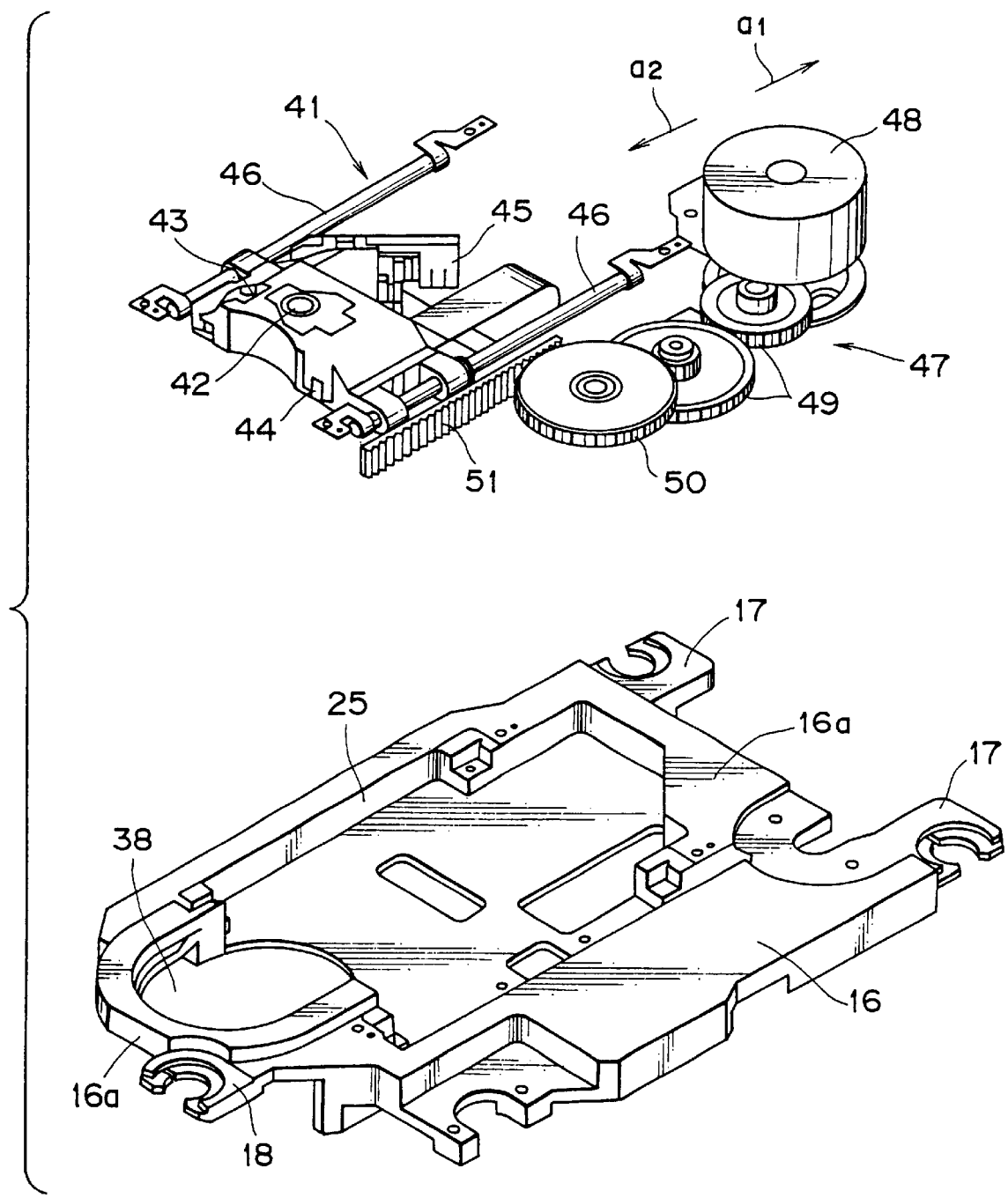
FIG. 13 is an exploded perspective view for illustrating a head moving mechanism and a lift frame of the optical disc drive in accordance with the previously applied invention.
Figure 14:
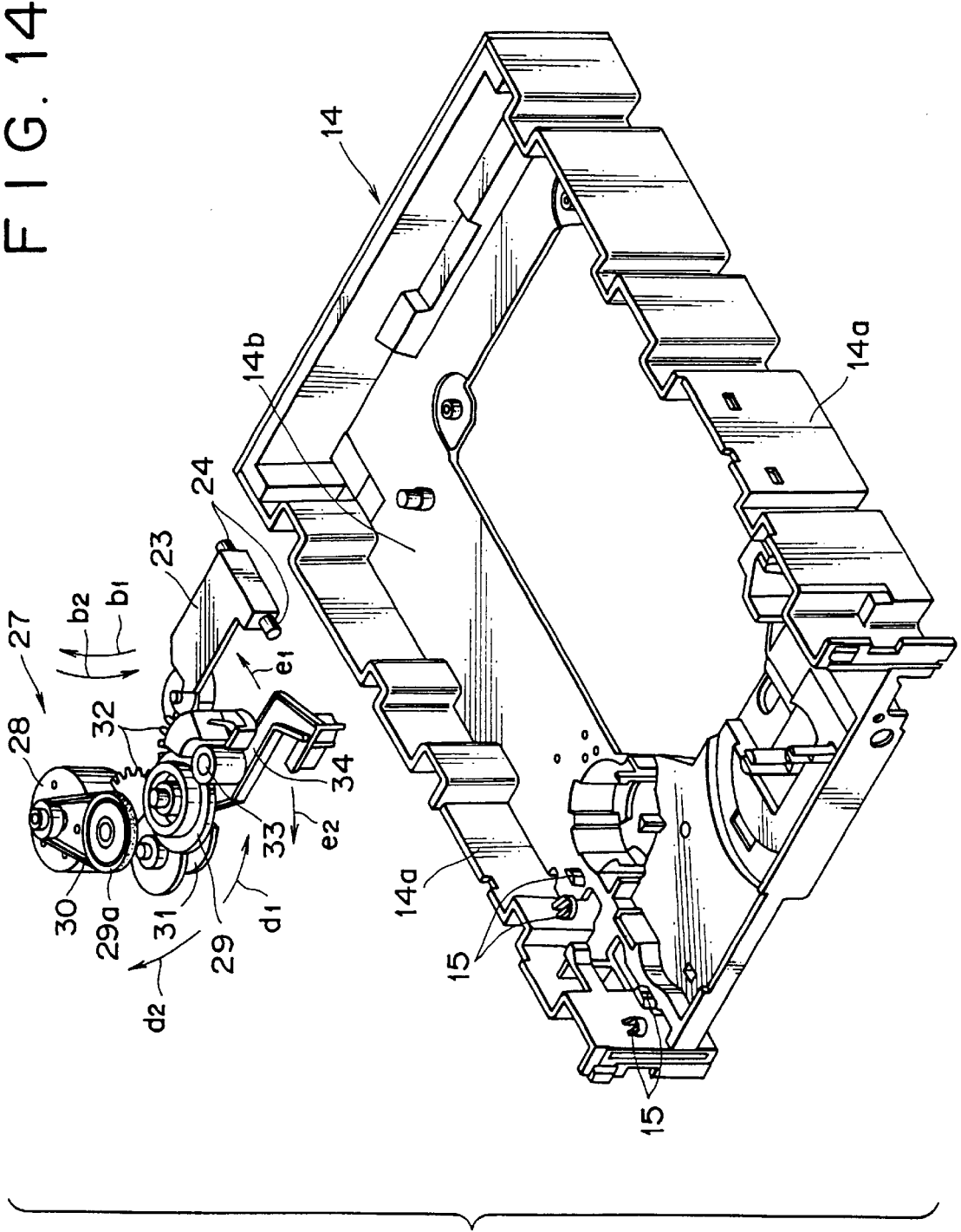
FIG. 14 is an exploded perspective view for illustrating a loading mechanism and a chassis of the optical disc drive in accordance with the previously applied invention.
Figure 15:
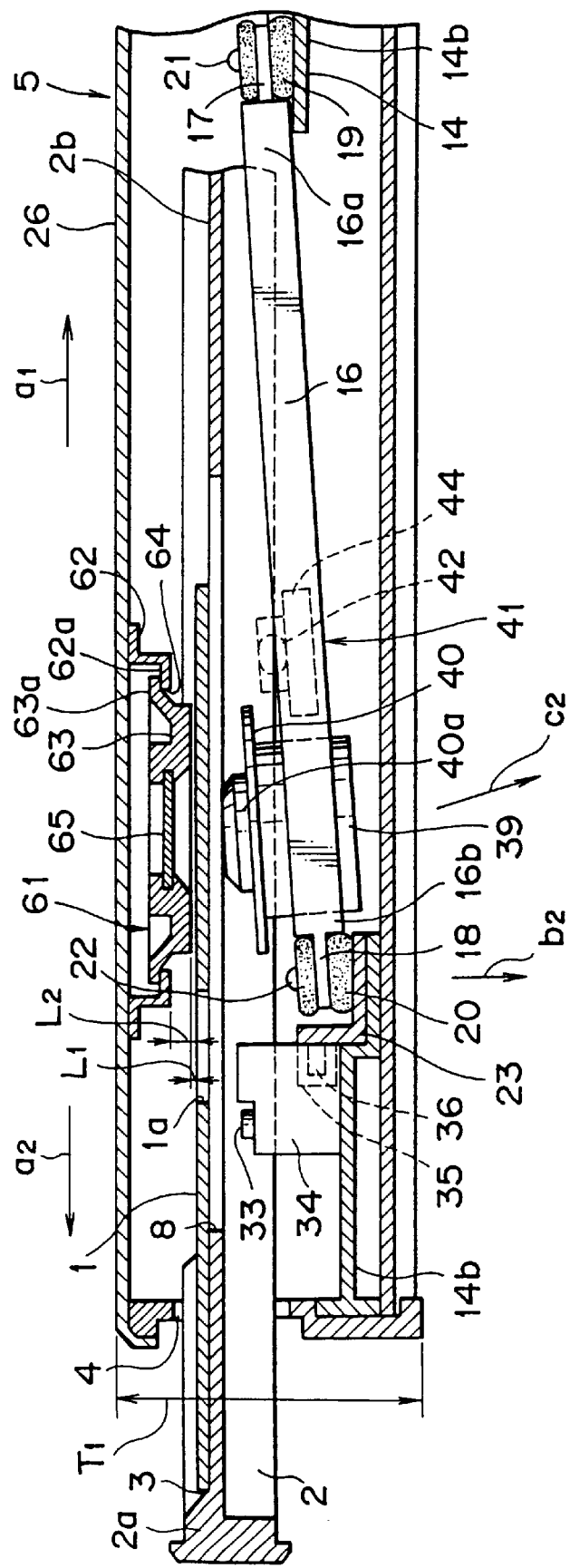
FIG. 15 is a cross sectional side view in unloading operation of the optical disc drive in accordance with the previously applied invention.
Figure 16:
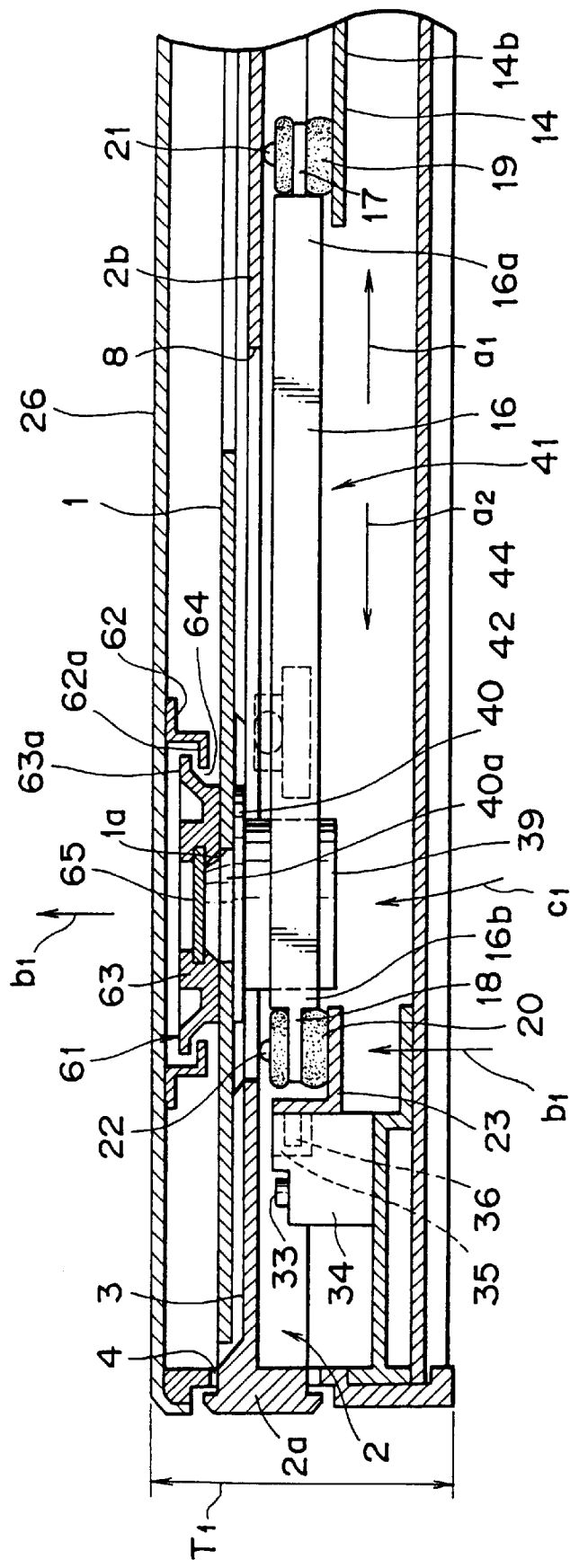
FIG. 16 is a cross sectional side view in disc chucking operation of the optical disc drive in accordance with the previously applied invention.
Figure 17:
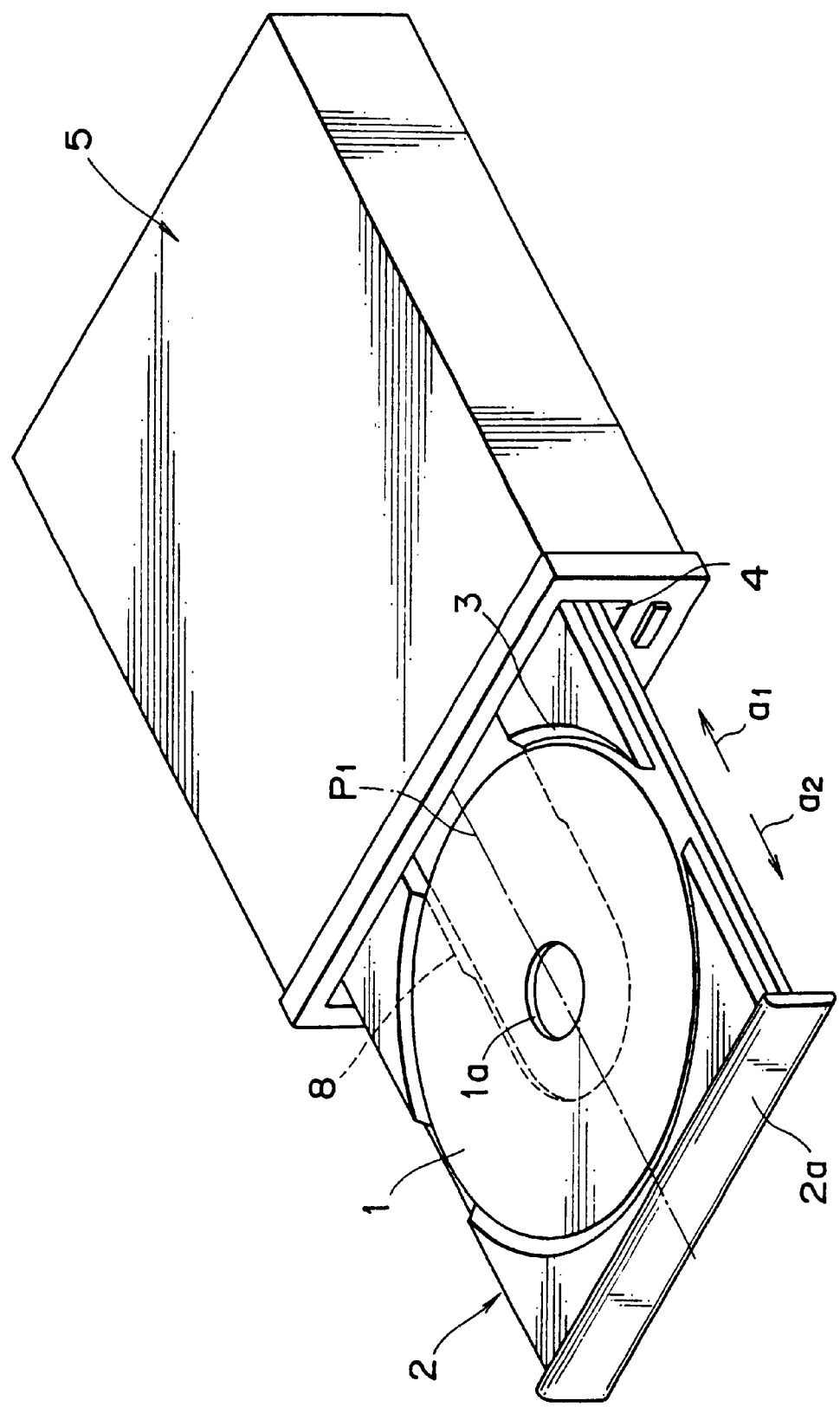
FIG. 17 is a perspective view in unloading operation of the whole optical disc drive in accordance with the previously applied invention.
Figure 18:
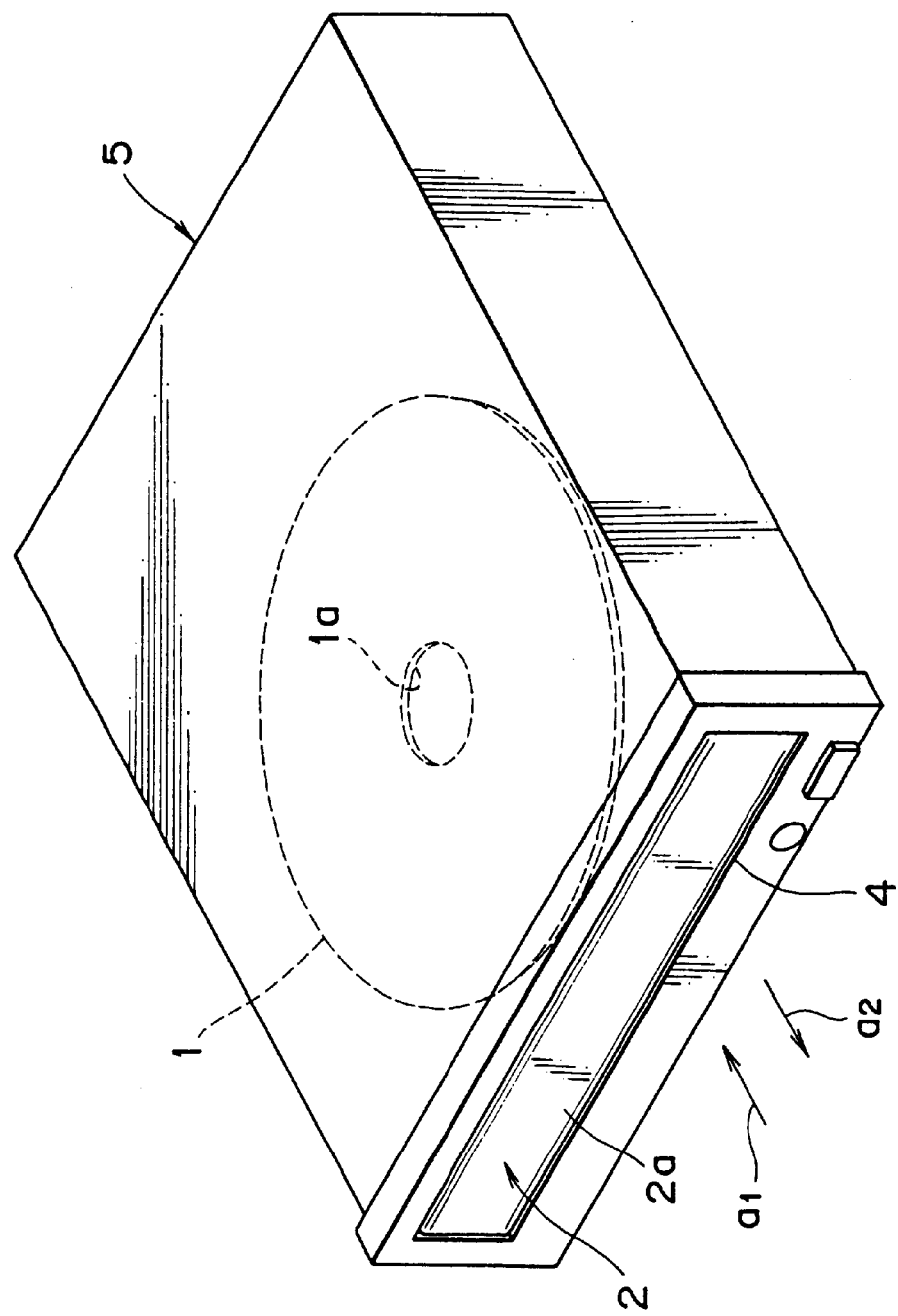
FIG. 18 is a perspective view in loading operation of the whole optical disc drive in accordance with the previously applied invention.

Next, the fifth embodiment of the disc clamp used in the present invention is shown in FIGS. 10A and 10B. In this embodiment, a ring-shaped gap 167 is provided above the ring-shaped magnet 568 embedded at the center of the disc clamp 563, thereby, using one magnet 568, the disc clamp 563 is magnetically attracted upward in unloading operation, on the other hand, the disc clamp 563 is magnetically attracted downward in chucking operation as shown in FIG. 10(B) and the disc clamp 563 chucks the optical disc 1 on the disc table 40, the same components as described in the embodiment shown in FIG. 9 are given the same characters, and the embodiment shown in FIGS. 10A and 10B exhibits the same operation and effects.

Embodiments of the present invention are described hereinbefore, however, the present invention is by no means limited to the above-mentioned embodiments, various modifications may be applied based on the technical spirit of the present invention. For example, the disc clamp may be pressed up using controllable electromagnetic force when the optical disc is unloaded.

What is claimed is:

1. A disc drive comprising:
   a disc tray for loading and ejecting a disc thereon, wherein said disc tray has a recess portion for receiving the disc therein and wherein said disc tray is at least one of loaded and unloaded from a disc drive;
   a loading mechanism for at least one of loading and unloading the disc tray;
   a disc table that raises from a first position to a second position after loading of said disc, upwardly engages a center hole of said disc, and lifts said disc to a space above said disc tray;
   a disc clamp comprising a first magnetic ring and a second magnetic ring, wherein said second magnetic ring has a diameter substantially different from a diameter of said first magnetic ring;

said disc clamp supported above said disc and configured to chuck said disc on said disc table at a chucking position by magnetic attraction of the disc clamp to said disc table engaged in said center hole of said disc; and a clamp support member configured to engage the disc clamp in an upper pressing position above the chucking position of said disc when said disc is unloaded;

wherein said disc clamp comprises guide means at the upper pressing position for positioning said disc clamp to the center rotation shaft of a spindle motor.

2. A disc drive as claimed in claim 1, wherein said guide means has a projection guide portion formed on a fixing member positioned above the disc drive and a recess groove formed on a top surface of the disc clamp.

3. A disc drive as claimed in claim 2, wherein said fixing member is a top plate of a disc drive container box.

4. A disc drive as claimed in claim 1, wherein said guide means has a recess groove formed on a fixing member positioned above the disc drive and a projection guide portion formed on a top surface of the disc clamp.

5. A disc drive as claimed in claim 1, wherein said disc drive has a projection guide portion positioned beneath said disc clamp and configured to engage a positioning hole formed at the center of said disc table when said disc is loaded.

6. A disc chucking device comprising:
a disc tray for loading and ejecting a disc thereon, wherein said disc tray has a recess portion for receiving the disc therein and wherein said disc tray is at least one of loaded and unloaded from a disc drive;

a loading mechanism for at least one of loading and unloading the disc tray;

a disc table comprising a magnetic material that raises from a lower position to an upper position after loading of said disc, engages a center hole of said disc, and lifts said disc above said disc tray;

a chucking pulley supported above said disc table by a pulley support member, configured to raise to a space above the pulley support member by said disc table engaged in the center hole of said disc and to chuck said disc on said disc table, said chucking pulley comprising a first magnetic implement and a second magnetic implement, wherein said second magnetic implement has a diameter substantially different from a diameter of said first magnetic implement;

said first magnetic implement configured to draw said chucking pulley down to said disc table side when said disc table is lifted from said lower position to said upper position after loading of said disc; and said second magnetic implement configured to draw said chucking pulley up from said pulley support member when said disc table is lowered from said upper position to said lower position to unload said disc.

7. A disc chucking device as claimed in claim 6, wherein said pulley support member supports a center of said chucking pulley.

8. A disc chucking device as claimed in claim 6, further comprising a centering member including a centering pin extending downward from a top cover comprising magnetic material, wherein said centering pin is inserted loosely into the center hole formed at the center of said chucking pulley at least in a vertical direction.

9. A disc chucking device as claimed in claim 6, wherein said disc chucking device is provided with a center pin extending downward from the center of the bottom surface of said chucking pulley, and a center hole formed at the center of the top surface of a centering guide of said disc table in which said center pin is inserted downward.

10. A disc chucking device comprising:
a disc tray for loading and unloading a disc thereon, wherein said disc tray has a recess portion for receiving the disc therein and wherein said disc tray is at least one of loaded and unloaded from a disc drive;

a loading mechanism for at least one of loading and unloading the disc tray;

a disc table comprising a magnetic material and configured to raise from a lower position to an upper position after loading of said disc to supportingly engage a center hole of said disc and to lift said disc to a space above said disc tray;

a chucking pulley supported by a pulley support member above said disc, said chucking pulley configured to raise to a space above said pulley support member and to chuck said disc on said disc table;

a first magnetic implement configured to draw said chucking pulley down to said disc table side when said disc table raises from said lower position to said upper position after loading of said disc; and a second magnetic implement configured to draw said chucking pulley up and apart from said pulley support member when said disc table is lowered from said upper position to said lower position to unload said disc, wherein said second magnetic implement has a diameter substantially different from a diameter of said first magnetic implement, wherein said first magnetic implement comprises (a) a first magnet fixed on said chucking pulley and having a prescribed magnetic attraction force and (b) a first yoke provided above said first magnet, and wherein said second magnetic implement comprises a second magnet fixed on said chucking pulley having a magnetic attraction force smaller than that of said first magnet and a magnetic member fixed above said first magnet.

11. A disc chucking device as claimed in claim 10, wherein:
said chucking pulley comprises a synthetic resin, said first magnet and said first yoke are shaped in the form of approximately coaxial rings, and said first magnet and said first yoke contact and are embedded horizontally at a center of said chucking pulley;

said first magnet is magnetized to have an S-pole and an N-pole on both ends of said first magnet in a diametrical direction; and said second magnet is shaped in the form of a disc having a diameter smaller than that of said first magnet embedded at the center of said chucking pulley above said first yoke.

12. A disc chucking device of an optical disc drive as claimed in claim 10, wherein said magnetic member comprises a top cover made of a metal plate above said pulley support means.

13. A disc chucking device comprising:
a disc tray for loading and unloading a disc thereon, wherein said disc tray has a recess portion for receiving the disc therein and wherein said disc tray is at least one of loaded and unloaded from a disc drive;

a loading mechanism for at least one of loading and unloading the disc tray;

a disc table comprising a magnetic material, configured to raise from a lower position to an upper position after loading of said disc, to supportingly engage a center hole of said disc, and to lift said disc to a space above said disc tray;

a chucking pulley supported by a pulley support member above said disc and configured to raise to a space above said pulley support member and to chuck said disc on said disc table, a cylindrical center portion, a disc-shaped disc pressing plate formed horizontally on the periphery of the bottom end of said center portion, a cylindrical peripheral wall portion rising upward from a periphery of said disc pressing plate, and a disc-shaped flange formed horizontally on the outer periphery of a top end of said center portion and inside the peripheral wall portion, formed combinedly of synthetic resin; and a pulley support member formed on a bottom surface of a top cover inserted in the inside of the peripheral wall portion of said chucking pulley to support said flange of said chucking pulley.

* * * * *